United States Patent [19]
Ohmori et al.

[11] Patent Number: 5,416,762
[45] Date of Patent: May 16, 1995

[54] IMPROVED DISC CARTRIDGE AND RECORDING AND/OR REPRODUCING APPARATUS HAVING MEANS FOR POSITIONING A TURNTABLE AND DISC CARTRIDGE SUPPORT STRUCTURE AND MEANS FOR REDUCING VIBRATIONS

[75] Inventors: Kiyoshi Ohmori, Kanagawa; Katsuhiro Seo, Tokyo, both of Japan

[73] Assignee: Sony Corporation, Tokyo, Japan

[21] Appl. No.: 869,642

[22] Filed: Apr. 16, 1992

[30] Foreign Application Priority Data

Apr. 19, 1991 [JP] Japan .................. 3-115436
Oct. 15, 1991 [JP] Japan .................. 3-293830

[51] Int. Cl.⁶ .................. G11B 7/09; G11B 17/04
[52] U.S. Cl. .................. 369/75.2; 369/77.2; 360/99.06
[58] Field of Search .................. 369/75.2, 77.2, 263, 369/264, 270, 271, 282, 213; 360/133, 99.12, 99.06

[56] References Cited

U.S. PATENT DOCUMENTS

| | | | |
|---|---|---|---|
| 4,466,031 | 8/1984 | Muraoka | 360/99.12 |
| 4,507,774 | 3/1985 | Marchant | 369/271 |
| 4,570,254 | 2/1986 | Agostini | 369/270 |
| 4,571,718 | 2/1986 | Cahill et al. | 369/291 |
| 4,719,526 | 1/1988 | Okita et al. | 369/77.2 |
| 4,772,971 | 9/1988 | Tokuda | 360/99.06 |
| 4,841,516 | 6/1989 | Ohmori et al. | 369/264 |
| 4,899,238 | 2/1990 | Inoue et al. | 360/99.06 |
| 4,901,172 | 2/1990 | Nakazawa et al. | 360/99.06 |
| 4,918,678 | 4/1990 | Dolby | 369/263 |
| 4,941,140 | 7/1990 | Ono et al. | 369/264 |
| 5,056,078 | 10/1991 | Carey et al. | 369/75.2 |

FOREIGN PATENT DOCUMENTS

| | | |
|---|---|---|
| 0187546A3 | 7/1986 | European Pat. Off. . |
| 0196691A1 | 10/1986 | European Pat. Off. . |
| 0216442A2 | 4/1987 | European Pat. Off. . |
| 0356984A2 | 3/1990 | European Pat. Off. . |
| 0397262A1 | 11/1990 | European Pat. Off. . |
| 2411461 | 7/1979 | France . |
| 2512253 | 3/1983 | France . |
| 3232327 | 3/1983 | Germany .................. 360/99.12 |
| 3607039A1 | 9/1986 | Germany . |
| 60-57542 | 4/1985 | Japan . |
| 1-89068 | 4/1989 | Japan .................. 369/264 |
| 3-12055 | 1/1991 | Japan .................. 369/270 |

OTHER PUBLICATIONS

Patent Abstracts of Japan, vol. 12, no. 359 (P-762), 27 Sep. 1988 & Jp-A-63 108 559 (Olympus), 13 May 1988.

*Primary Examiner*—Stuart S. Levy
*Assistant Examiner*—Kevin M. Watkins
*Attorney, Agent, or Firm*—Limbach & Limbach; Philip M. Shaw, Jr.

[57] ABSTRACT

A disc recording and/or reproducing apparatus includes a holding device for holding a disc cartridge which is a cartridge main body and a disc housed in the cartridge main body, a rotating and driving device for rotationally driving the disc housed within the holding device, and a positioning device provided within the rotating and driving device for positioning the disc cartridge housed within the holding device. The recording disc may be positioned highly accurately within the disc cartridge in such a manner that resonant vibrations may be prevented from being produced on the chassis.

7 Claims, 19 Drawing Sheets

IMPROVED DISC CARTRIDGE AND RECORDING AND/OR REPRODUCING APPARATUS HAVING MEANS FOR POSITIONING A TURNTABLE AND DISC CARTRIDGE SUPPORT STRUCTURE AND MEANS FOR REDUCING VIBRATIONS

BACKGROUND OF THE INVENTION

1. Field of the Invention

This invention relates to a disc recording and/or reproducing apparatus for recording and/or reproducing information signals using a disc cartridge comprised of a disc housed within a cartridge main body.

2. Description of the Prior Art

There has been proposed a recording/reproducing apparatus for recording and/or reproducing information signals using a disc cartridge comprised of a recording disc, such as an optical disc or a magneto-optical disc, housed within a cartridge main body.

The recording/reproducing apparatus, disclosed in, for example, U.S. Pat. No. 3,845,502, includes a loading unit for transporting the disc cartridge to a predetermined loading position, a rotating driving unit for holding the recording disc of the disc cartridge in its loading position and rotationally driving the disc, and a head device for writing and/or reading the information signals on or from the recording disc.

The loading unit is adapted for moving a cartridge holder by a cam or the like, which cartridge holder is adapted for holding the disc cartridge. The cartridge holder is adapted for holding the disc cartridge in parallel with the chassis. The loading unit shifts the cartridge main body, held by the cartridge holder, in a direction parallel to the major surface of the recording disc, that is, parallel to the chassis. When the recording disc is at a position directly above the rotating driving unit, the loading unit shifts the disc cartridge in a direction normal to the chassis and in a direction approaching the chassis.

The recording disc housed within the disc cartridge, thus moved in the direction approaching the chassis, is held by the rotating driving unit mounted on the chassis.

The head device is mounted on the chassis for facing the major surface, that is the signal recording surface, of the recording disc rotated by the rotating driving unit. The head device is supported for being moved radially across the inner and outer peripheries of the disc. With the recording disc being rotated and the head device being moved radially of the recording disc, the information signals may be recorded and/or read on or from substantially the entire signal recording surface of the recording disc.

Meanwhile, if the recording disc is an optical disc or a magneto-optical disc, an optical pickup device is used as the head device. This optical pickup device includes an optical lens driving device for effecting focusing and tracking servo control operations for servo controlling the light flux radiated onto the recording disc against deviations or offsets caused by revolutions of the recording disc brought about by the rotating driving unit. This object lens driving device supports the object lens for converging the light flux emanated from a light source of the optical pickup device by a supporting member which is formed of a flexible material for supporting the object lens for movement along an optical axis of the object lens and in a direction normal thereto, that is in a focusing direction and in a tracking direction.

The object lens driving device also includes electromagnetic driving means for moving the lens in these two directions, These electromagnetic driving means include a coil mounted on a lens bobbin holding the object lens and supplied with a driving current and a magnetic circuit adapted for causing the magnetic flux to pass through the coil.

In the above-described disc recording/reproducing apparatus, the disc cartridge is positioned along its height and in an in-plane direction parallel to the chassis, with the chassis as a reference, while the recording disc is positioned along its height and in its in-plane direction by the rotating driving unit. That is, the disc cartridge is positioned in the vertical and horizontal directions with respect to the chassis by being engaged with or set on the distal end of a positioning pin mounted upright on the chassis. On the other hand, the recording disc is set and positioned on a disc table of the rotating driving unit. The disc table is substantially in the form of a disk mounted on a driving shaft of a spindle motor adapted for rotationally driving the recording disc. The spindle motor is mounted on the chassis.

In the disc recording/reproducing apparatus, it is difficult to maintain a predetermined relative position between the cartridge main body of the disc cartridge in the loaded position and the recording disc. Since the cartridge main body is positioned along its height and in the horizontal direction with respect to the chassis by the positioning pin provided on the chassis, while the recording disc is separately positioned by the disc table of the rotating driving unit, it is difficult to adjust the two positioning means, that is the positioning pin and the disc table, with respect to each other. It is because the recording disc holding position is subject to an error which is the sum total of errors of the spindle motor and the disc table and dimensional errors produced when mounting the spindle motor and the disc table. For accurately positioning and holding the recording disc so that the recording disc is not abutted against the inner wall of the cartridge main body during disc rotation, the spindle motor and the disc table need to be mounted with high accuracy, thus complicating the production.

On the other hand, for positioning the cartridge main body of the disc cartridge separately from the recording disc, it is necessary to provide a positioning member, such as the positioning pin, thus increasing the number of component parts.

Besides, in the disc recording/reproducing apparatus, provided with the above-described loading unit, since the loading unit is complicated in construction, it is difficult to simplify and reduce the size of the structure, as well as to simplify the production.

In addition, the above-described disc recording/reproducing apparatus, since both the rotating driving unit and the optical pickup device are mounted on the chassis, a loop of resonant vibrations tends to be produced between the rotating driving unit and the pickup device. That is, in the present disc recording/reproducing apparatus, vibrations induced in the disc driving rotating device and those induced in the optical pickup device tend to be propagated through the chassis to interfere with each other to produce resonant vibrations not only of the driving rotating unit and the optical pickup device but also of the chassis. If such resonant vibrations are produced, the optical pickup device cannot be operated satisfactorily, so that the information signals cannot be recorded or reproduced satisfactorily.

Although means such as changing the chassis shape have been used for preventing these resonant vibrations, it has been difficult to prevent these resonant vibrations completely.

OBJECTS AND SUMMARY OF THE INVENTION

In view of the above depicted status of the art, it is an object of the present invention to provide a disc recording/reproducing apparatus in which the recording disc position in the cartridge main body may be maintained with high accuracy without increasing the number of component parts, and in which production is facilitated.

It is another object of the present invention to provide a disc recording/reproducing apparatus in which resonant vibrations on the chassis may be inhibited despite its simplified construction.

In the disc recording/reproducing apparatus of the present invention, since positioning means for setting the height position of the cartridge main body housing the recording disc is provided at a stationary part of rotating and driving means adapted for rotationally driving the recording disc, it is possible to maintain the relative position between the disc cartridge and the recording disc with a high degree of accuracy.

The rotating and driving means for holding and rotating the recording disc is lifted and lowered relative to the chassis by a cam mechanism as it holds the disc, so that no resonant loop is formed between the driving means and the chassis.

By providing detection means for detecting rotation of the final stage gear of the cam mechanism, the height position of the rotating and driving means may be controlled based on the rotation of the final stage gear.

By providing a vibration absorbing member between a driving part rotating a disc table carrying the recording disc and a stationary part holding the driving part, it becomes possible to prevent the vibrations from being transmitted between the driving and stationary parts.

Finally, since the portion of the disc table carrying the recording disc and rotationally driven by driving means which is abutted by the recording disc is constituted by a vibration absorber, it becomes possible to prevent vibrations from being transmitted from the chassis etc. to the recording disc.

DESCRIPTION OF THE PREFERRED EMBODIMENTS

Figure 1:
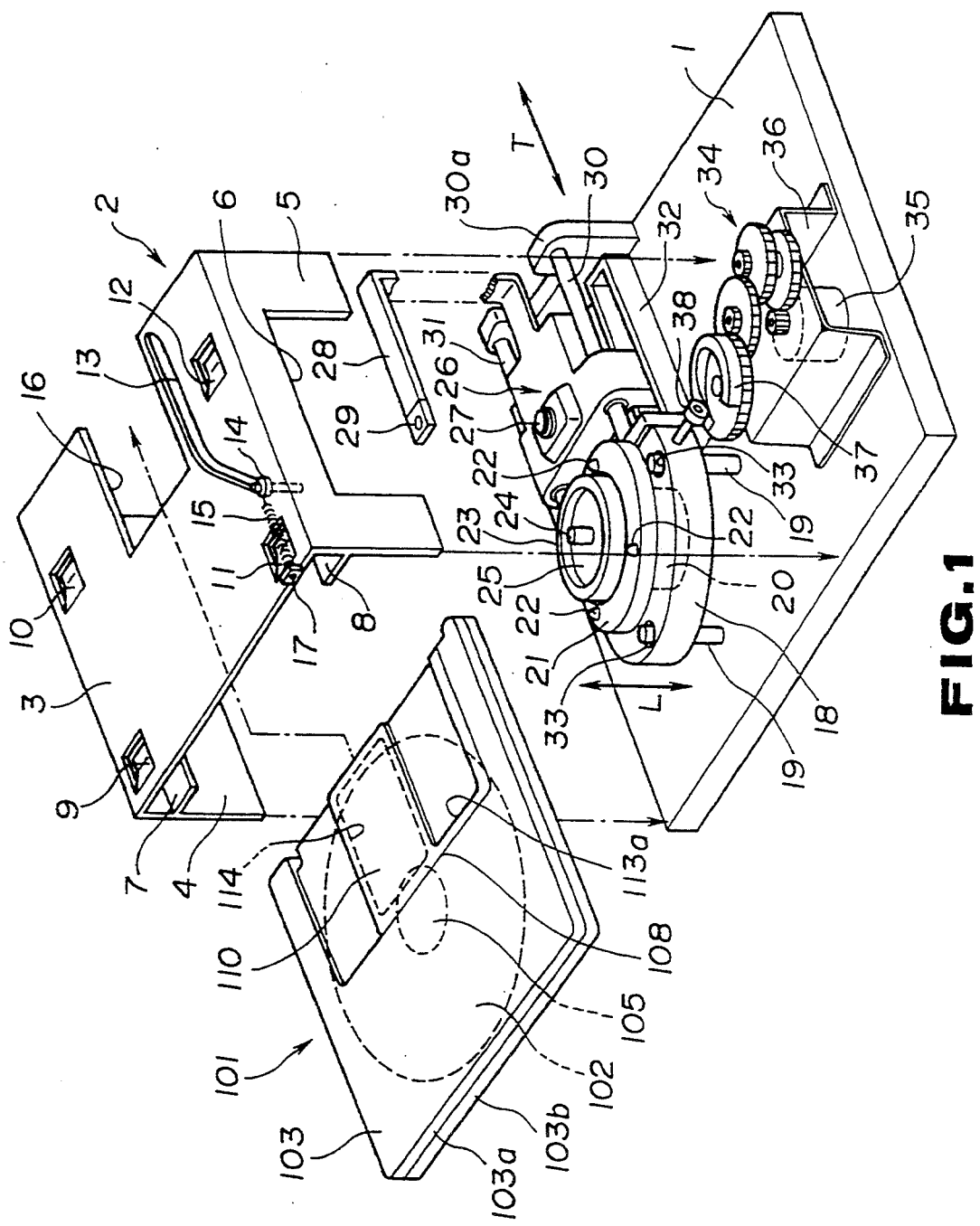
FIG. 1 is a partially exploded perspective view showing a disc recording/reproducing apparatus according to an embodiment of the present invention and a disc cartridge loaded therein.

Referring to the drawings, preferred illustrative embodiments of the present invention will be explained in detail.

The disc recording/reproducing apparatus according to the present invention is designed for recording and-/or reproducing information signals using a disc cartridge in which a magneto-optical disc as a recording disc is housed in a cartridge main body.

Figure 9:
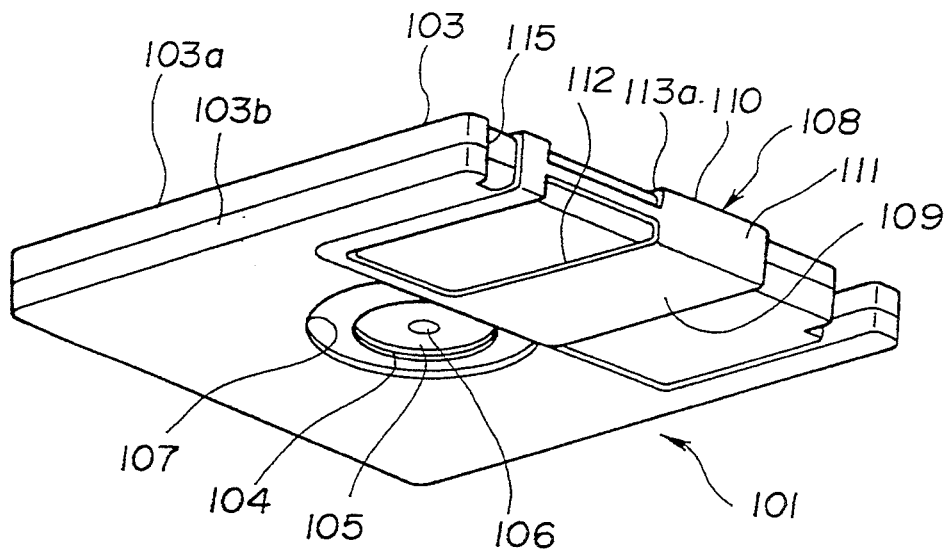
FIG. 9 is a perspective view, from the bottom side, showing a construction of a disc cartridge loaded in the disc recording/reproducing apparatus shown in FIG. 1.
Figure 10:
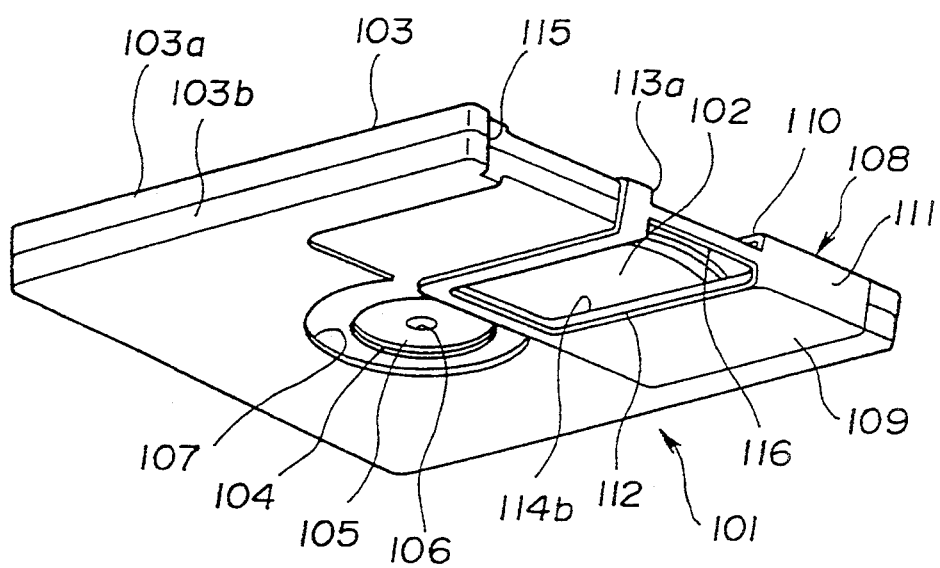
FIG. 10 is a perspective view, from the bottom side, showing the state in which a shutter member of the disc cartridge shown in FIG. 8 is opened.

Referring to FIGS. 9 and 10, the disc cartridge is comprised of a magneto-optical disc 102 rotatably housed within a cartridge main body 103. The magneto-optical disc 102 is disk-shaped in its entirety and is comprised of a disc substrate formed of a light-transmitting material, such as synthetic resin, and a signal recording layer of a magnetic material deposited on one major surface of the disc substrate. A disc hub 105, by means of which the magneto-optical disc 102 is held by a disc table 23, is provided at a mid part of the disc 102. The disc hub 105 is formed of a magnetic material, such as metal, and attached substantially concentrically to the disc 102, such as with an adhesive or by welding. At the center of the disc hub 105, a centering hole 106 is formed, which has its center coincident with the center of curvature of a recording track(s) formed spirally or concentrically on the signal recording layer.

The cartridge main body 103 is constituted by an upper half 103a and a lower half 103b which are abutted and connected to each other in the form of a thin casing in which to hold the magneto-optical disc 102. A pair of recording/reproducing apertures 114a, 114b, for laying both major surfaces of the magneto-optical disc to outside across the inner and outer disc peripheries, are formed in the upper and lower major surfaces of the cartridge main body 103. These recording/reproducing apertures 114a, 114b are of the same size and shape and formed in a facing relation to each other. The recording/reproducing aperture 114a in the upper major surface of the cartridge main body 103 is adapted for laying one of the major surfaces of the disc 103 to outside, while the recording/reproducing aperture 114b in the lower major surface of the cartridge main body 103 is adapted for laying the other major surface of the cartridge main body 103 to outside.

A chucking opening 104 for laying the disc hub 105 to outside is formed at the center of the major surface of the lower half 103a of the cartridge main body 103. A positioning recess 107 engaged by abutment protuberances 22 of a cartridge positioning member 21 is formed on a rim of the chucking opening 104, as will be explained subsequently.

A shutter member 108, mounted on the cartridge main body 103, is formed by injection molding or bending a synthetic resin material or by bending a metallic plate into a cross-sectional shape of a letter U, and is adapted for clamping the upper and lower major surfaces of the cartridge main body 103. Thus the shutter member 108 is integrally constituted by an upper plate section 110 extended along the upper major surface of the cartridge main body 103, a lower plate section 109 extended parallel to and facing the upper plate 110 and a connecting web 111 interconnecting the proximal sides of the plate sections 110, 109. The shutter member 108 is supported by the cartridge main body 103 for movement along a lateral side of the cartridge main body 103 engaged with the connecting web 111. The plate sections 110, 109 are formed with apertures 113a, 113b at offset positions along the direction of movement of the shutter member with respect to the cartridge main body 103.

When the shutter member 108 is positioned at one side position relative to the cartridge main body 103, as shown in FIG. 9, the parts of the plate sections 110, 109 of the shutter member 108 not provided with the apertures 113a, 113b are at the position of facing and closing the recording/reproducing apertures 114a, 114b, as shown in FIG. 9, When the shutter member 108 is positioned at the other side position relative to the cartridge main body 103, as shown in FIG. 10, the apertures 113a, 113b of the shutter member 108 are in register with the recording/reproducing apertures 114a, 114b for opening the apertures 114a, 114b, shown in FIG. 10. Meanwhile, the shutter member 108 is normally resiliently biased towards the one side position of closing the recording/reproducing apertures 114a, 114b by a bias spring, not shown.

The apertures 113a, 113b are formed for extending into parts of both side regions of the connecting web 111. That is, the portions of the connecting web 111 contiguous to the apertures 113a, 113b are of a narrower width than the remaining portions of the connecting web which width is less than the thickness of the magneto-optical disc 102. A forward side 116 of the cartridge main body 103, facing the outer rim of the magneto-optical disc 102 and connecting to the recording-/reproducing apertures 114a, 114b, that is the side of the cartridge main body facing the outside via the apertures 113a, 113b when the recording/reproducing apertures 114a, 114b are opened, is of a thickness less than the thickness of the magneto-optical disc 102.

Figure 3:
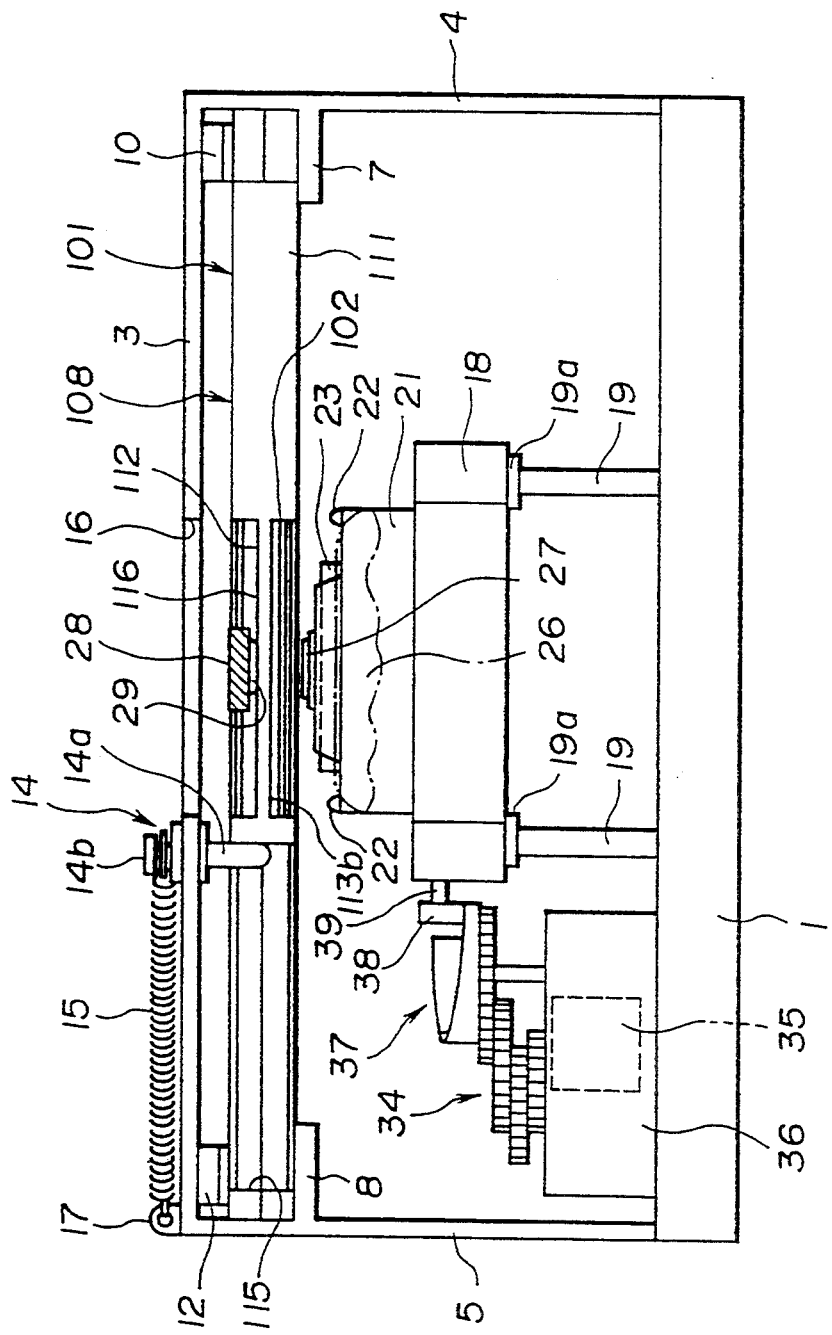
FIG. 3 is an enlarged back side view showing the state in which the operation of inserting the disc cartridge into the disc recording/reproducing apparatus is just completed.
Figure 4:
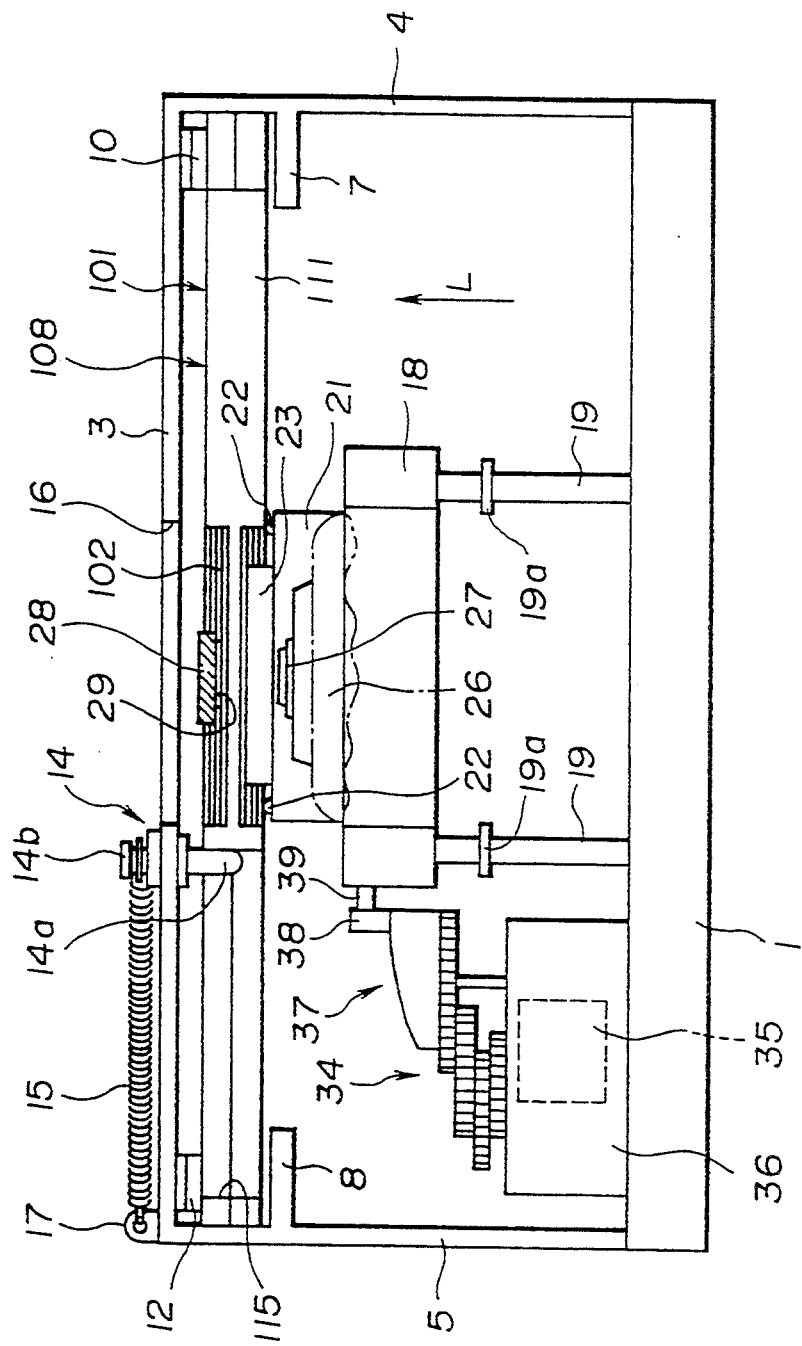
FIG. 4 is an enlarged back side view showing the state in which the operation of holding the disc cartridge inserted into the disc recording/reproducing apparatus is just completed.
Figure 5:
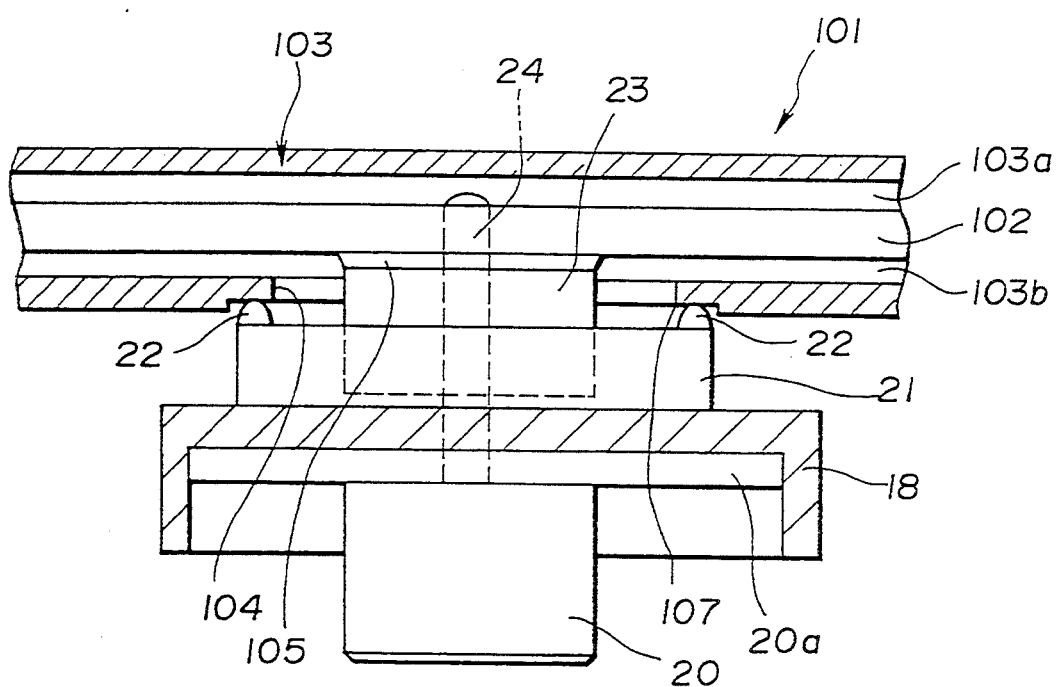
FIG. 5 is an enlarged partial cross-sectional view showing a construction of a spindle motor employed in the disc recording/reproducing apparatus shown in FIG. 1 and its near-by portion.

Referring to FIGS. 1 to 4, the disc recording and/or reproducing apparatus is provided with a chassis 1. A spindle motor 20 constituting rotating driving means for rotating a disc 102 housed within the disc cartridge 101 is provided on the chassis 1. This spindle motor 20 is mounted via a motor attachment plate 20a to a vertically movable block 18 operating as a stationary part of the rotating driving means, as shown in FIG. 5, The vertically movable block 18 has plural through-holes 33 each provided with a slide bearing, The vertically movable block 18 may be moved in a direction towards and away from the chassis 1 along motor guide shafts 19 set upright on the chassis 1, as shown by arrow L in FIG. 1, by passing these motor guide shafts 19 through the through-holes 33. That is, the spindle motor 20 mounted on the vertically movable block may be moved towards and away from the chassis 1. That is, the spindle motor 20 has a spindle shaft 24, integral with a driving shaft, supported substantially upstandingly with respect to the chassis 1, The spindle shaft 24 has its distal end directed upwardly of the chassis 1.

Meanwhile, the motor attachment plate 20a is formed of a material exhibiting high vibration absorbing properties and sufficient toughness to support the spindle motor 20, such as synthetic resin or hard rubber. Thus, with the present disc recording/reproducing apparatus, as viewed as a vibrating system, the spindle motor 20 and the chassis are isolated from each other by the motor attachment plate 20a, such that vibrations produced during rotation of the disc 102 by the spindle motor 20 may be absorbed by the motor attachment plate 20 so that these vibrations may be transmitted only difficulty to the chassis 1 to prevent the occurrence of resonance otherwise caused by transmission of vibrations between the spindle motor 20 and the chassis 1.

Figure 6:
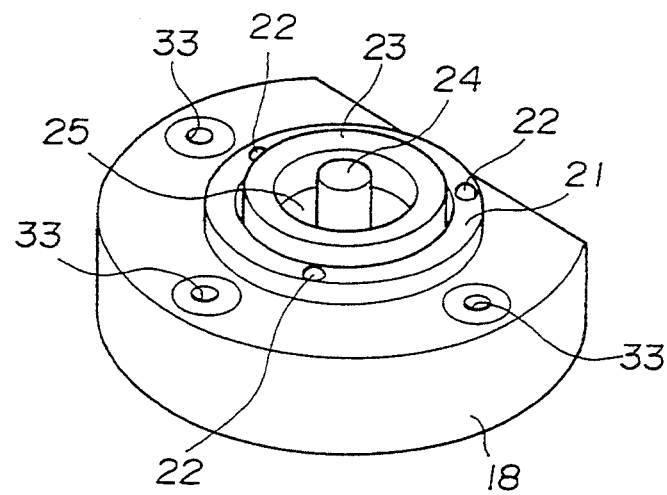
FIG. 6 is an enlarged perspective view showing the construction of a spindle motor employed in the disc recording/reproducing apparatus and its near-by portion.

Alternatively, instead of providing the motor attachment plate 20a as a vibration absorber, the rim part of the upper surface of the disc table 23 abutted by the disc hub 105 may be formed of synthetic resin or hard rubber so as to be operated as a vibration absorber. It is possible in this case to prevent vibrations from being propagated between the recording disc and the chassis 1 in the recording/reproducing apparatus. The disc table 23 is mounted on the driving shaft 24 of the spindle motor 20 for encircling the distal end of the driving shaft 24, as shown in FIG. 6. The disc table 23 is formed as a disk of approximately the same diameter as the disc hub 105 of the magneto-optical disc 102 so as to permit the disc hub 105 to be placed thereon. An annular permanent magnet 25 is placed in an annulus defined between the spindle shaft 24 and the rim part of the disc table 23 for magnetically attracting the disc hub 105 of the magneto-optical disc 102 placed on the disc table 23.

A substantially annular cartridge body positioning member 21, operated as disc cartridge positioning means, is mounted around the outer rim of the disc table 23 on the upper surface of the vertically movable block 18. In the present embodiment of the cartridge body positioning member 21, the upper surface thereof is provided with at least three protuberances 22 for supporting and setting the position of the disc cartridge 101. That is, the plane defined by the ends of these protuberances 22 is closer to the chassis 1 than the setting plane of the disc hub 105 on the disc table 23 and is parallel to this disc hub setting plane. The distance between the upper surface of the disc table 23 and the end parts of the protuberances 22 is so selected that, when the positioning recess 107 of the cartridge main body 103 is set in position on the projections 22, the disc hub 105 may be set in position on the disc table 23 at a position in which the disc 102 housed within the cartridge main body is spaced apart from the inner wall of the cartridge main body 103.

Figure 7:
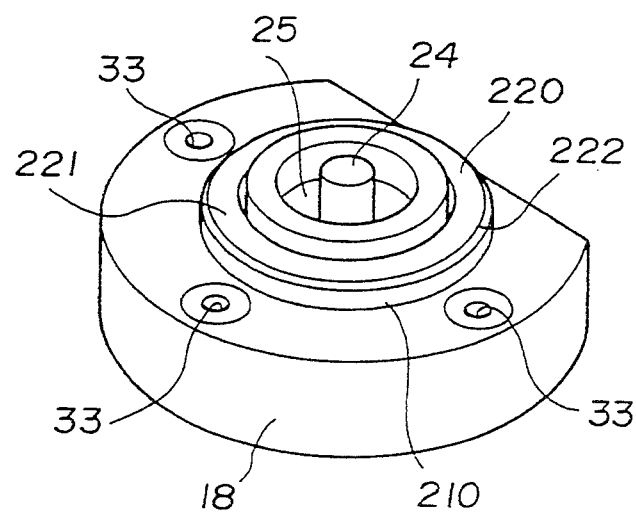
FIG. 7 is an enlarged perspective view showing a modified construction of a spindle motor employed in the disc recording/reproducing apparatus shown in FIG. 1 and its near-by portion.

At although in the disclosed embodiment, the vertically movable block 18 provides for positioning the disc cartridge 101 by providing projections 22 on the upper surface of the cartridge body positioning member 21. However, the vertically movable block 18 may also be provided with a cartridge body positioning member having a planar upper surface, as shown in FIG. 7. The cartridge body positioning member 210 shown in FIG. 7 is provided with an annular projection 220 having a planar upper surface 221, instead of the above-mentioned protuberances. An inclined guide surface 222 is defined around an outer upper rim of the annular projection 220. By this inclined guide surface 222, the cartridge body positioning member 210 has its planar upper surface 221 guided into registry with the positioning recess 107 of the cartridge main body 103 for abutting on and supporting the cartridge main body 103 for positioning the cartridge main body 103 with respect to the magneto-optical disc 102 of the disc cartridge 101.

A lifting electric motor 35 for lifting, that is for vertically moving, the vertically movable block 18, along with the disc table 23, with respect to the chassis 1, is provided on the chassis 1 laterally of the spindle motor 20. This lifting motor 35 is provided on a gear box 36 provided on the chassis 1. The gear box 36 is provided with a reducing gear set 34 comprised of plural spur gears engaged with a driving gear fitted on a driving shaft of the lifting motor 35. This reducing gear 34 is adapted for transmission of the driving power of the lifting motor 35 with speed reduction for rotating a cam gear 37 rotatably supported by the gear box 36. This cam gear 37 has its cam section engaged by an arm 39 mounted on the vertically movable block 18 so that, when the cam gear 37 is rotated, the vertically movable block 18 is moved vertically by means of the cam section and the arm 39. Meanwhile, the cam section of the cam gear 37 is an end cam defined around the major surface of the cam gear 37. An annular rotatable member 38 for reducing the friction between the arm 39 and the cam section 37 is mounted by means of a rotational bearing at the distal end of the arm 39 engaged with the cam section. The lifting motor 35 is a stepping motor for controlling the rotational angular position by a controller of the recording/reproducing apparatus.

An optical pickup device 26 is provided on the chassis 1 at the back of the spindle motor 20 along the inserting direction of the disc cartridge 101. The optical pickup device 26 is comprised of a light source, such as a laser diode, plural optical components for guiding the light flux from this light source, an object lens 27 for converging and radiating the light flux guided by the optical components, and a photodetector for detecting the light flux reflected back via object lens 27 to the optical pickup device. The optical pickup device 26 is adapted for radiating the information writing and readout light flux to the magneto-optical disc 102. The object lens 27 is mounted on the upper surface of the optical pickup device 26 for radiating the light flux upward in a direction parallel to the spindle shaft 24 away from the chassis 1. The object lens 27 is mounted stationarily with respect to the optical pickup device 26.

The optical pickup device 26 is supported by a pair of pickup guide shafts 30, 31 supported on the chassis 1 parallel thereto by a shaft supporting member 30, and may be moved along the pickup guide shafts 30, 31 radially of the magneto-optical disc. The optical pickup device 26 is moved in a direction approaching the spindle motor 20, that is towards the inner rim of the disc 102, or in a direction away from the spindle motor 20, or towards the outer rim of the disc 102, as indicated by arrow T. The optical pickup device 26 is moved along the pickup feed motor 32 which is a linear motor provided on the chassis 1.

The optical pickup device 26 is fitted with a magnetic head device 29 via a magnetic head supporting arm 28, The magnetic head 29 is adapted for applying an external signal-writing magnetic field to the magneto-optical disc 102. The magnetic head supporting arm 28 has its proximal end supported by the optical pickup device 26 and has its mid part and distal end bent so that the distal end faces the object lens 27 of the optical pickup device 26, The magnetic head device 29 is mounted on the distal end of the magnetic head supporting arm 28 for facing the object lens 27. The magnetic head device 28 and the object lens 27 are spaced apart from each other at a distance equal to the sum of the thickness of the magneto-optical disc 102 and the working distance of the object lens 27 taking account of deviations from the surface plane of the magneto-optical disc 102 produced during rotation of the magneto-optical disc 102. Meanwhile, the working distance of the object lens 27 is the distance from the end point to the focal point of the object lens 27.

A cartridge holder 2 is provided above the chassis 1. The cartridge holder 2 can be produced by bending a metallic plate and is comprised of an upper plate section 3 and a pair of side wall sections 4 and 5 depending from both sides of the upper plate section 3. The cartridge holder 3 is mounted on the chassis 1 by having the lower ends of the side wall sections 4 and 5 by the upper surface of the chassis 1. An opening 106 is formed in one of the sidewall sections 4 or 5 for providing a clearance to the gear box 36.

The front and rear sides of the cartridge holder 2 are opened to permit, the disc cartridge 101 to be introduced into the holder 2 in a position parallel to the chassis 1. Disc cartridge guide lugs 7 and 8 are provided on the inner sides of the side walls 4 and 5 for extending in a direction facing each other. These guide lugs 7 and 8 are provided parallel to the upper plate section 3 so that the distance between the lugs and the upper plate section 3 is slightly larger than the thickness of the cartridge main body 103. The disc cartridge 101 is introduced in a space defined between the upper plate section 3 and the lugs 7, 8. Disc cartridge thrusting spring sections 9 to 12 are provided at, such positions on the upper plate section 3 that are in register with the four corners of the cartridge main body 103 of the disc cartridge 101 inserted below the upper plate section 3. These spring sections 9 to 12 are formed by segmenting parts of the upper plate section 3 and bending the segmented parts down towards the chassis 1. These thrusting spring sections 9 to 12 are adapted for thrusting and supporting the disc cartridge 101, inserted between the upper plate section 3 and the cartridge body guide lugs 7, 8, against the cartridge body guide lugs 7, 8.

A shutter opening pin 14 for opening the shutter member 108 of the disc cartridge 101 is provided at, the upper plate section 3. This shutter opening pin 14 is mounted on the upper plate section 3 by being introduced into a guide slit 13 formed in the upper plate section 3 so as to be moved along the slit 13. The slit 13 is formed in the upper plate section 13 with such a curve that its forward end is close to the lateral wall section 5 and it increasingly approaches the center of the upper plate section 3 in a direction towards its rear end. The shutter opening pin 14 has its upper end section 14a projected above the upper plate section 3 and has its lower end section projected below the upper plate section 3, that is towards the chassis 1. A tension coil spring 15 is provided between the upper end section 14b of the shutter opening pin 14b and a spring retainer 17 provided at the forward side of the upper plate section 3. That is, the shutter opening pin 14 is biased by the tension coil spring 15 towards the forward side of the upper plate section 3 until being engaged at an initial position thereof in abutment against the forward end of the guide slit 13.

When loading the disc cartridge 101 in the above-described disc recording/reproducing apparatus of the preset invention, the disc cartridge 101 is introduced from the forward side into a space between the upper plate section 3 and the cartridge body guide lugs 7, 8. At this time, the disc cartridge 101 is introduced with the lateral side thereof fitted with the shutter member 108 directed forward as shown in FIG. 1.

Figure 2:
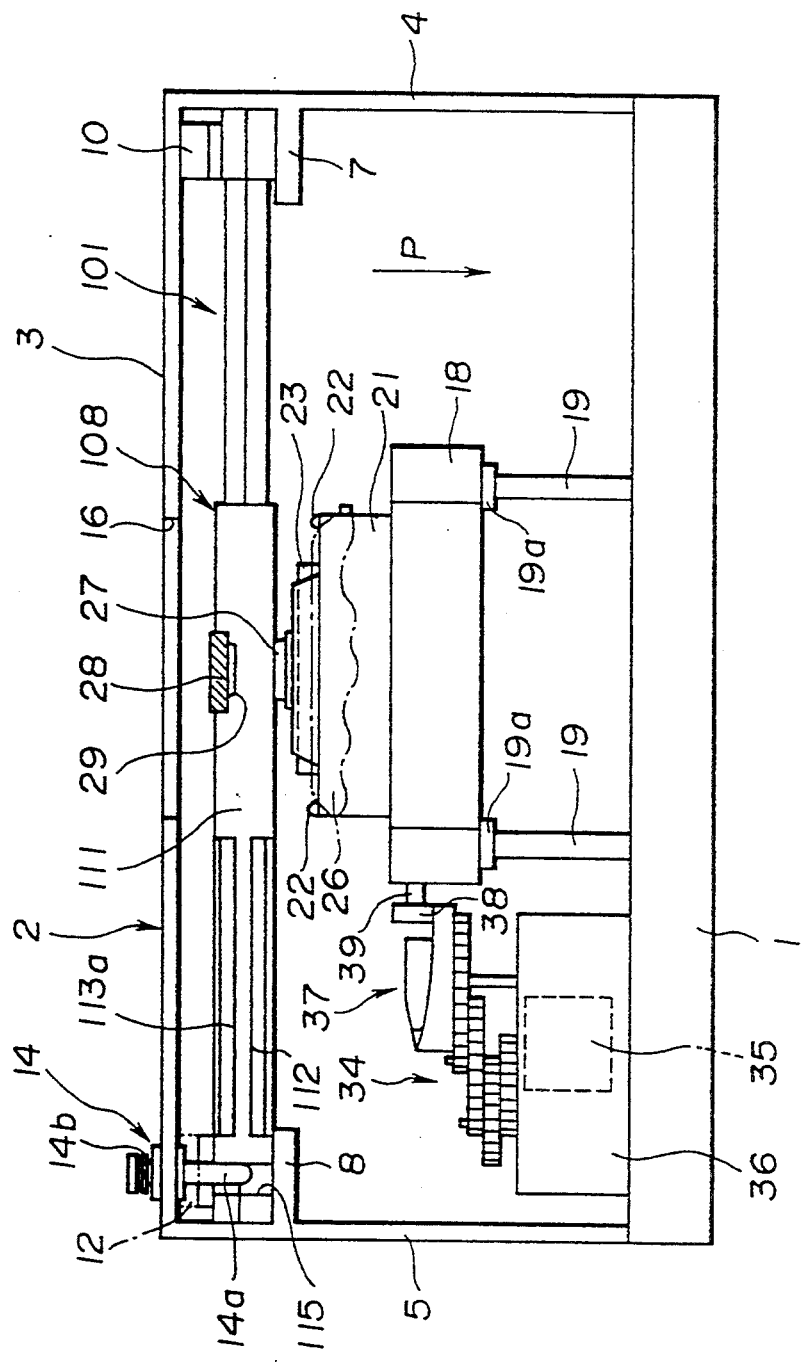
FIG. 2 is an enlarged back side view showing the state in which the operation of inserting a disc cartridge into the disc recording/reproducing apparatus is just started.

Then, as shown in FIG. 2, the lower end section 14a of the shutter opening pin 14 is abutted against one end of the connecting web section 111 of the shutter member 108 fitted on a lateral side of the cartridge main body 103. It is noted that a recess 115 adapted to be engaged by the lower end section 14a of the shutter opening pin 14 is formed in the vicinity of the above-mentioned one end of the connecting web section 111 engaged with the lower end section 14a of the shutter opening pin 14.

When the disc cartridge 101 is introduced further into the space between the upper plate section 3 and the guide lugs 7, 8, the shutter opening pin 14 is thrust by the cartridge main body 103 and thereby moved reawards, as shown in FIG. 3. At this time, the shutter opening pin 14 thrusts the connecting web 111 of the shutter member 108, while being moved along the guide slit 13, for moving the shutter member 108 for opening the recording/reproducing apertures 114a, 114b. When the shutter member 108 opens the recording/reproducing apertures 114a, 114b, the foremost parts of the apertures 113a, 113b are positioned substantially at a mid part of the lateral side of the cartridge main body 103. The forward side 116 of the cartridge main body 103 is then laid to outside via these apertures 113a, 113b.

When the disc cartridge 101 is introduced further, the disc cartridge 101 is moved towards the rear as viewed in the inserting direction thereof, while being thrust towards the guide lugs 7 and 8 within the cartridge holder 2 by the thrusting spring sections 9 to 12, as indicated by arrow P in FIG. 2. At this time, the disc cartridge 101 is moved in such a manner that the narrow width part of the connecting web section 111, the forward lateral side 116 of the cartridge main body 3 and the disc 102 pass through the spacing between the object lens 27 and the magnetic head device 29 in this sequence. Inasmuch as the distance between the object lens 27 and the magnetic head device 29 is wider than the thickness of the disc 102, the disc 102 may be passed through the spacing between the object lens 27 and the magnetic head device 29 without being abutted against the object lens 27 or the magnetic head device 29. Meanwhile, the vertically movable block 18 is positioned in its initial position with the lower surface thereof abutted against positioning steps 19a, 19a provided on the motor guide shafts 19, 19.

When the disc cartridge 101 is inserted to a predetermined end of insertion position, the disc table 23 faces the disc hub 105 substantially coaxially therewith. At this time, a detection device, such as a detection switch, senses that the disc cartridge 101 is loaded to the end position, and a corresponding detection signal indicating the end of insertion is transmitted to a control let of the recording/reproducing apparatus. The controller then starts to drive the lifting motor 35. By the operation of the lifting motor 35, the cam gear 37 is rotated via reducing gear 34 so that, as shown by an arrow L in FIG. 4, the vertically movable block 18 is moved upwards away from the chassis 1. When the lifting block 18 is raised to a predetermined loading position, the disc hub 105 of the disc 102 is set on the disc table 23, as shown in FIGS. 4 and 5, at the same time that the disc hub 105 is set on the cartridge body positioning member 21. The distal end of the spindle shaft 24 is engaged at this time in the centering hole 106, while the positioning recess 107 of the cartridge main body 103 is engaged by the protuberances 22 of the cartridge body positioning member 21. The disc hub 105 is held by the disc table 23 under the force of attraction exerted by the permanent magnet 25.

The cartridge main body 103, thus set on the cartridge body positioning member 21, is positioned within the cartridge holder 2 by the cartridge guide lugs 7, 8 against the bias of the cartridge body thrusting spring sections 9 to 12. With the disc hub 105 thus set on the disc table 23, the magneto-optical disc 102 is positioned with its major surfaces spaced apart from the inner wall sections of the cartridge main body 103. That is, since the distance between the upper surface of the disc table 23 and the end parts of the protuberances 22 of the cartridge body positioning member 21 is constant at all times, the magneto-optical disc 102 is maintained at a constant position with respect to the inner wall sections of the cartridge main body 103 within the cartridge main body 103.

When the spindle motor 20 is driven in this state by the above-mentioned controller, the disc 102 is rotated, along with the disc table 23, without being contacted with the inner wall section of the cartridge main body 103.

Figure 8:
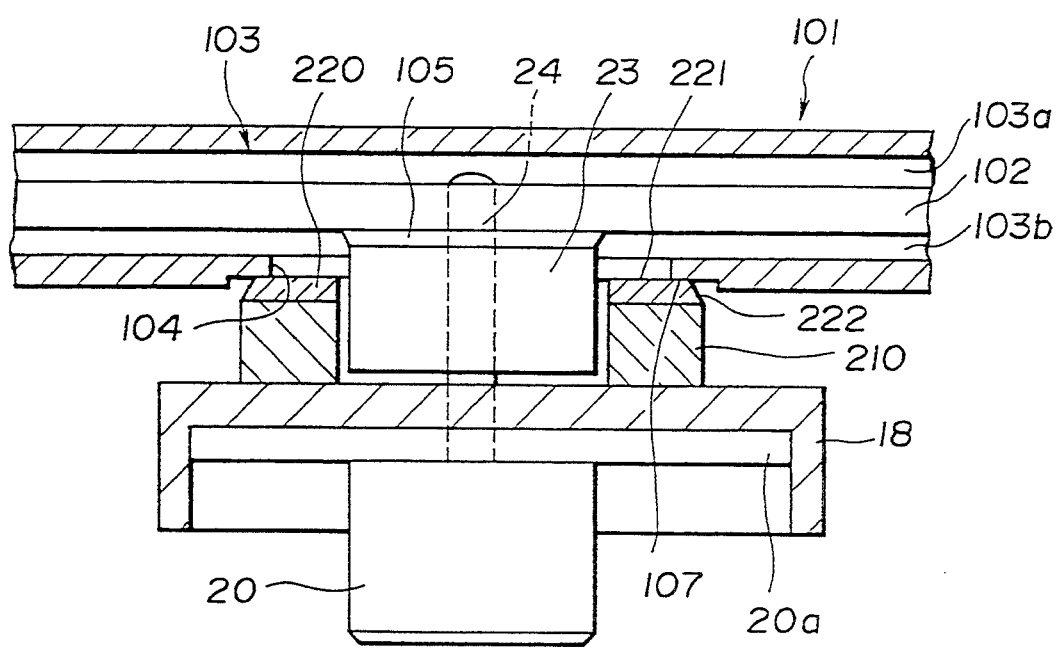
FIG. 8 is an enlarged partial cross-sectional view showing the construction of a spindle motor employed in the disc recording/reproducing apparatus shown in FIG. 8 and its near-by portion.

In a modification of the cartridge body positioning member shown in FIG. 7, the disc 102 may similarly be maintained at a constant position with respect to the inner wall sections of the cartridge main body 103 within the inside of the cartridge main body 103, as shown in FIG. 8.

That is, by setting the cartridge main body 103 on the planar surface section 221 provided on the annular projection 220 of the cartridge body positioning member 210, the cartridge main body 103 may be positioned at a position removed from the guide lugs 7, 8 against the bias of the cartridge body thrusting spring sections 9 to 12. Also, by setting the disc hub 105 on the disc table 23, the magneto-optical disc 102 within the cartridge main body 103 may be positioned so that its major surfaces are spaced apart from the inner wall sections of the cartridge main body 103. Since the upper surface section of the disc table 23 is always at a constant distance from the upper surface of the annular projections 220 of the cartridge body positioning member 210, the magneto-optical disc 102 is maintained at a constant position from the inner wall sections of the cartridge main body 103 within the inside of the cartridge main body 103.

Since the disc cartridge 101 may be positioned in the present embodiment by the cartridge body positioning members 21, 210 provided in the vicinity of the disc table 23 holding the disc 102, the relative position between the cartridge main body 103 and the disc 102 may be maintained accurately.

Figure 11:
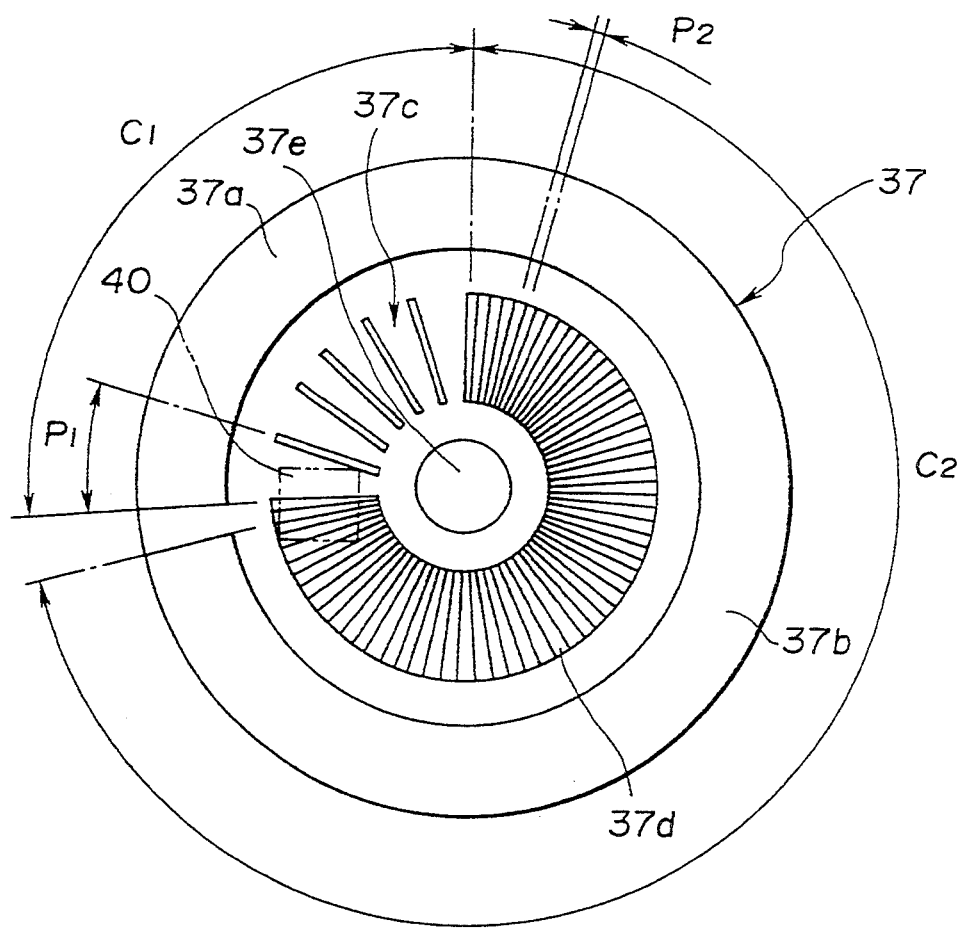
FIG. 11 is a plan view showing a construction of a cam gear of the disc recording/reproducing apparatus shown in FIG. 1.
Figure 12:
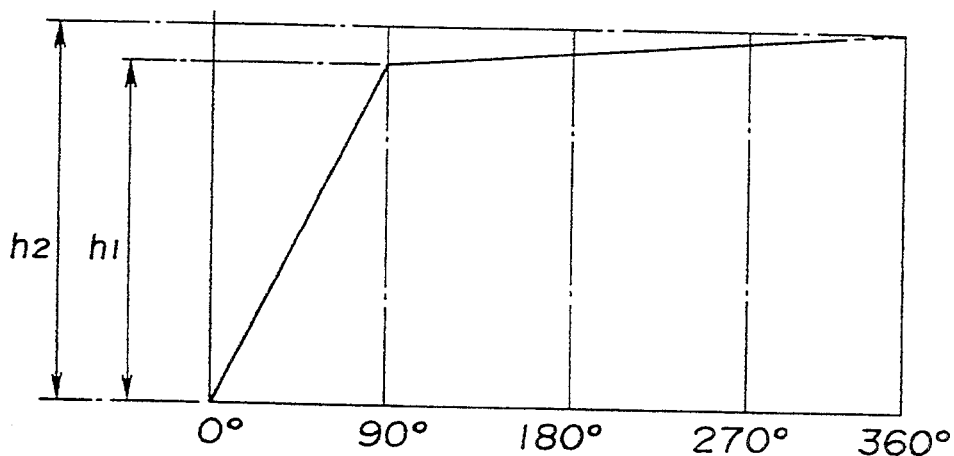
FIG. 12 is a diagrammatic view showing a cam profile of the cam gear shown in FIG. 11.

Referring to FIG. 11, the cam gear 37 has a cam part made up of a first cam section 37a for holding the disc 102 as described above, that is for effecting a loading operation, and a second cam section 37b for adjusting the height position of the disc cartridge 101 after the end of the loading operation. These first and second cam sections 37a, 37b are so formed that, as shown by arrows $C_1$, $C_2$ in FIG. 11, the first cam section 37a has an angular extent of approximately 90°, while the second cam section 37b has an angular extent of approximately 270° contiguous to the first cam section 37a. The height and the gradient, that is the cam profile, of these cam sections 37a, 37b is such that, as shown by the cam diagram of FIG. 12, the first cam section 37a acutely reaches a first height in the angular range of approximately 90°, as shown by an arrow $h_1$ in FIG. 12, and the second cam section 37b then gradually reaches from the first height to the entire cam height within a range of approximately 270°, as shown by an arrow $h_2$ in FIG. 12.

The cam gear 37 is provided with a rotary encoder for detecting the rotational angular position of the cam gear 37. The rotary encoder is constituted by a first group of encoder slits 37c and a second group of encoder slits 37d, these slits being formed radially through an extent of approximately 360° with a supporting shaft 37e of the cam gear as a center, and a photodetector 40 provided facing these encoder slits 37c, 37d. The detection unit 40 is adapted for radiating a light flux from a light source to the encoder slits 37c, 37d of the cam gear 37 for detecting the light flux transmitted through or reflected back from these encoder slits 37c, 37d by the photodetector 40 for generating a detection signal used for calculating the rotational speed as well as the rotational angular position of the cam gear 37.

The first group encoder slits 37c are provided in association with the first cam section 37a at a first pitch angle between the adjacent slits as indicated by an arrow $P_1$ in FIG. 11. The second group encoder slits 37d are provided in association with the second cam section 37b at a second pitch angle between the adjacent slits far smaller than the first pitch angle as indicated by an arrow $P_2$ in FIG. 11.

Since the second cam section 37b has a mild gradient, and the pitch angle between the second group encoder slits 37d is small, the lifting motor 20 may be accurately moved with a minute step of e.g. 1 μm with respect to the lifting block 18, with the arm 39 resting on the second cam section 37b. In this manner, in the present disc recording/reproducing apparatus, by performing fine vertical movement of the vertically movable block 18 after the end of the loading operation, the disc 102 may be adjusted so as to be at a predetermined position relative to the object lens 27.

In this manner, with the present disc recording/reproducing apparatus, by driving the lifting motor 35 by the above-mentioned controller based on focusing error signals derived from the optical pickup device, the signal recording surface of the disc 102 may be brought into coincidence with a focal point of the light flux by the object lens 27, by way of performing a so-called focusing servo controlling operation. Thus, with the optical pickup device 26 of the present disc recording/reproducing apparatus, there is no necessity of providing a so-called object lens driving device (actuator) for driving the object lens 27 along the optical axis.

Meanwhile, in the optical pickup device of the disc recording/reproducing apparatus, a so-called tracking servo operation of causing the light flux from the optical pickup device 26 to follow periodic movements of the recording track radially of the disc 102 due to offsets the disc 102 accompanying rotation of the disc 102 is performed by moving the optical pickup device 26 along the pickup guide shafts 30, 31. However, this tracking servo operation may also be achieved by moving only the object lens 27 relative to the optical pickup device 26 radially of the disc 102 by supporting the object lens 27 by a so-called object lens driving unit. The tracking servo may also be performed by causing the light flux from the light source of the optical pickup device to be incident on the object lens 27 via a so-called tracking mirror and by offsetting the tracking mirror in one direction to offset the light flux incident on the object lens 27.

In the above described first embodiment, the vertically movable block 18, provided with the spindle motor 20, is moved vertically in a controlled manner by the cam gear 37 to which a rotational power is transmitted from the lifting motor 35.

However, with the first embodiment, the construction tends to be complicated because of the necessity of providing components such as speed reducing gear or cam gear. A second embodiment of the disc recording/reproducing apparatus, whereby the vertically movable block 18 may be moved vertically by a simpler construction, is hereinafter explained. Those parts or components similar to those of the preceding embodiment are denoted by the same numerals and the detailed description is omitted for simplicity.

Figure 13:
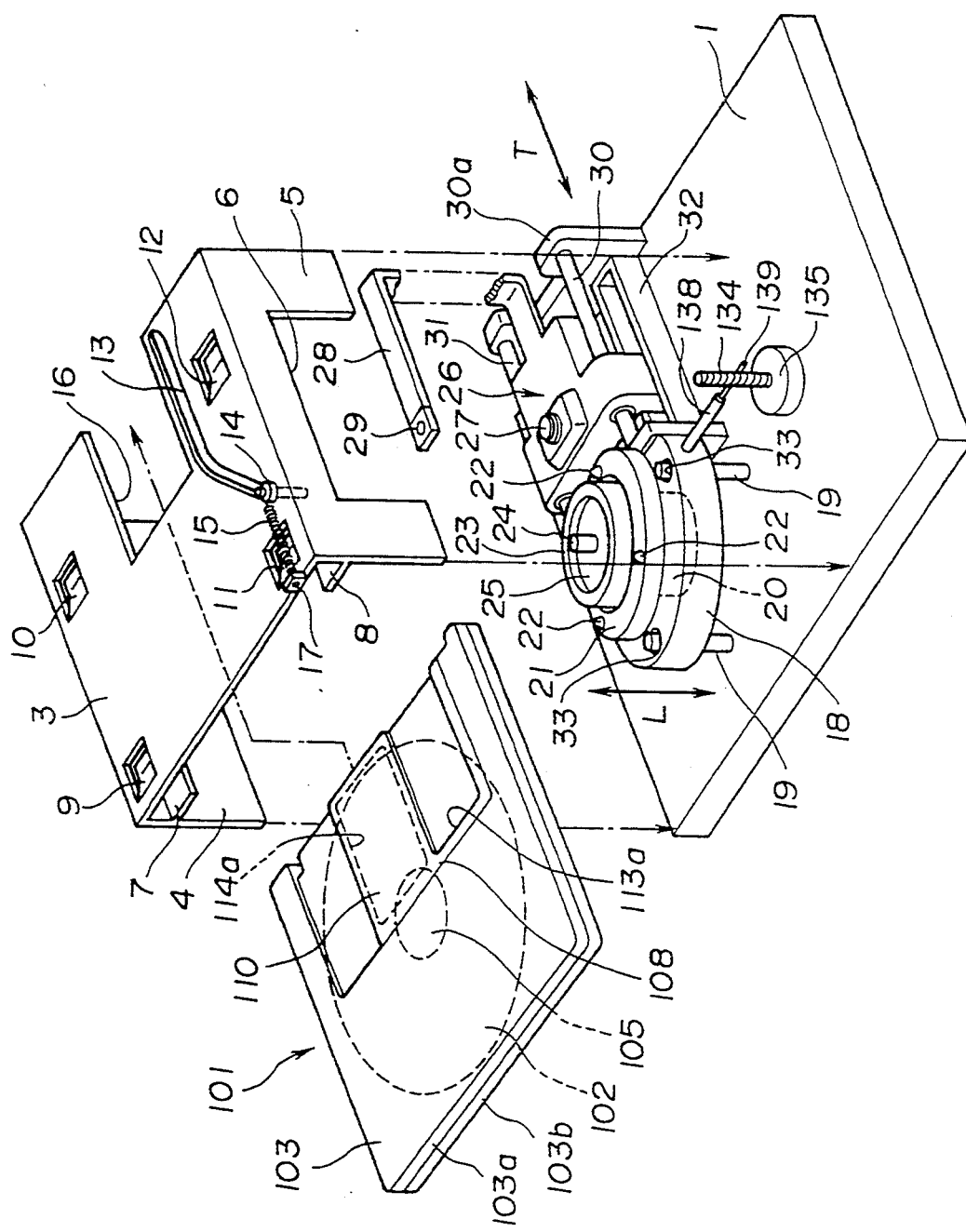
FIG. 13 is a partially exploded perspective view showing a disc recording/reproducing apparatus according to a modified embodiment of the present invention, and a disc cartridge introduced therein.

Referring to FIG. 13, a lifting motor 135 for lifting or lowering the vertically movable block 18 along with the disc table 23, that is for bringing these into or out of contact with the chassis 1, is provided on the chassis 1 laterally of the spindle motor 20. This lifting motor 135 is arranged on the chassis 11. A lead screw 134 is mounted as one on a driving shaft of the lifting motor 35. This lead screw 134 is supported substantially vertically with respect to the chassis 1. The screw part formed on the outer periphery of the lead screw 134 is engaged by an end engaging section 139 of an arm 138 mounted on the vertically movable block 18, so that the block 18 may be lifted or lowered by means of the arm 138 with rotation of the lead screw 134. Meanwhile, the lifting motor 135 is a stepping motor for controlling the rotational angular position by the controller of the disc recording/reproducing apparatus.

For loading the disc cartridge 101 into the above-described disc recording/reproducing apparatus, the disc cartridge 101 is introduced via a space between the upper plate section 3 and the cartridge body guide lugs 7 and 8. At this time, the disc cartridge 101 is introduced with the lateral side thereof fitted with the shutter member 108 directed forwards, as shown in FIG. 13.

Figure 14:
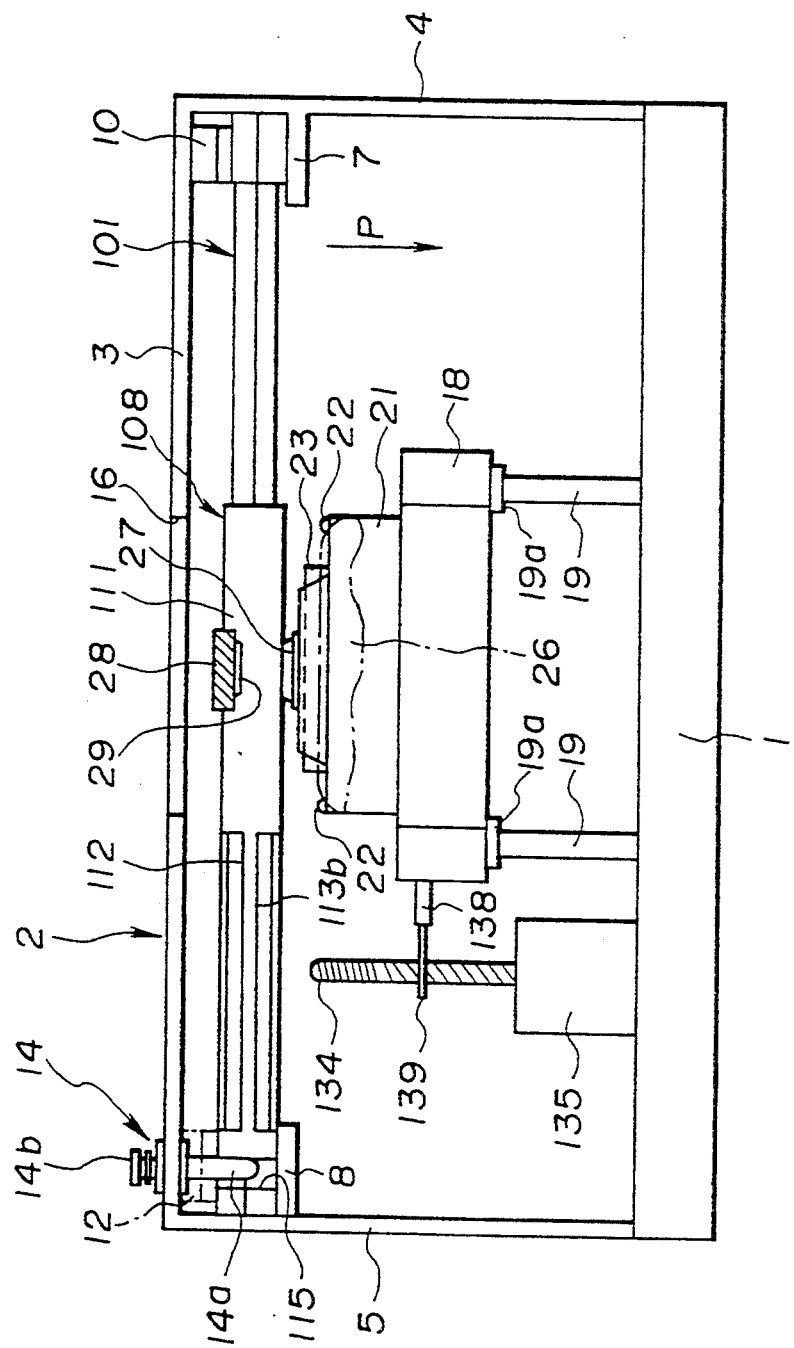
FIG. 14 is an enlarged back side view showing the state in which the operation of introducing the disc cartridge into the disc recording/reproducing apparatus shown in FIG. 13 is just started.

Then, as shown in FIG. 14, the lower end section 14a of the shutter opening pin 14 is abutted against the vicinity of one end of the connecting web 111 of the shutter member 108 on one lateral side of the cartridge main body 103. The cartridge main body 103 is provided with a recess 115, adapted to be engaged by the lower end section 14a of the shutter opening pin 14, in the vicinity of the one end of the connecting web 111 abutted by the lower end section 14a.

Figure 15:
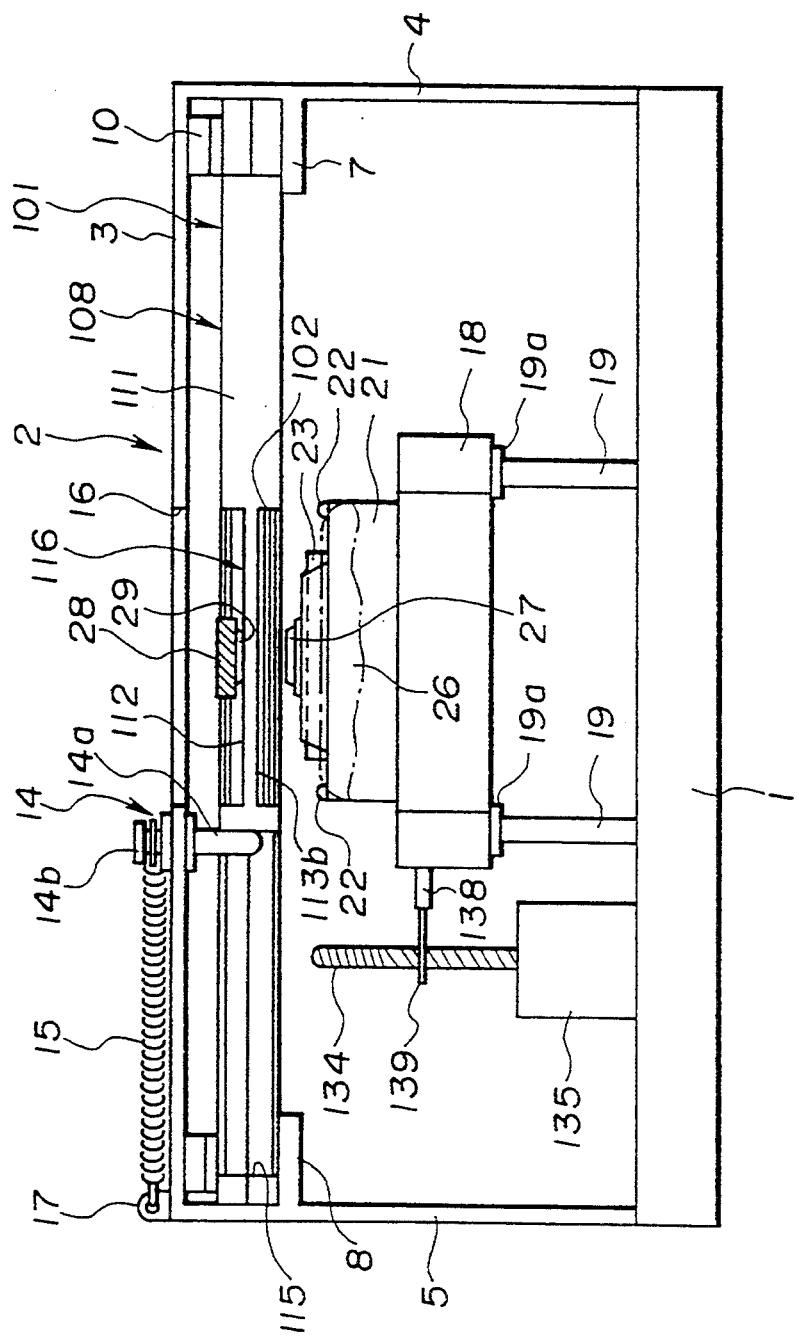
FIG. 15 is an enlarged back side view showing the state in which the operation of introducing the disc cartridge into the disc recording/reproducing apparatus shown in FIG. 13 is just completed.

When the disc cartridge 101 is introduced further into the space between the upper plate section 3 and the guide lugs 7, 8, the shutter opening pin 14 is thrust by the Cartridge main body 103 and thereby moved rearwards, as shown in FIG. 15. At this time, the shutter opening pin 14 thrusts the connecting web 111 of the shutter member 108, while being moved along the guide slit 13, for moving the shutter member 108 for opening the recording/reproducing apertures 114a, 114b. When the shutter member 108 opens the recording/reproducing apertures 114a, 114b, the foremost parts of the apertures 112, 113a are positioned substantially at a mid part of the lateral side of the cartridge main body 103. The forward side 116 of the cartridge main body 103 is then laid to outside via these apertures 112, 113a.

When the disc cartridge 101 is introduced further, the disc cartridge 101 is moved rearward in the inserting direction thereof as the disc cartridge is thrust towards the guide lugs 7, 8 by the cartridge body thrusting spring sections 9 to 12 as indicated by arrow P in FIG. 14. The disc cartridge 101 is so moved that the narrow width section of the connecting web 111 and then the forward side 116 of the cartridge main body 103 are guided through the space between the object lens 27 and the magnetic head device 29 and finally the disc 102 is introduced into the space between the lens 27 and the magnetic head device 29. Since the distance between the object lens 27 and the magnetic head device 29 is selected to be larger than the thickness of the magneto-optical disc 102, the disc 102 may be introduced through the space between the lens 27 and the head device 29 without colliding against these components. The vertically movable block 18 is positioned at this time in its initial position by having its lower surface abutted against the positioning steps 19a, 19a provided on the motor guide shafts 19, 19.

Figure 16:
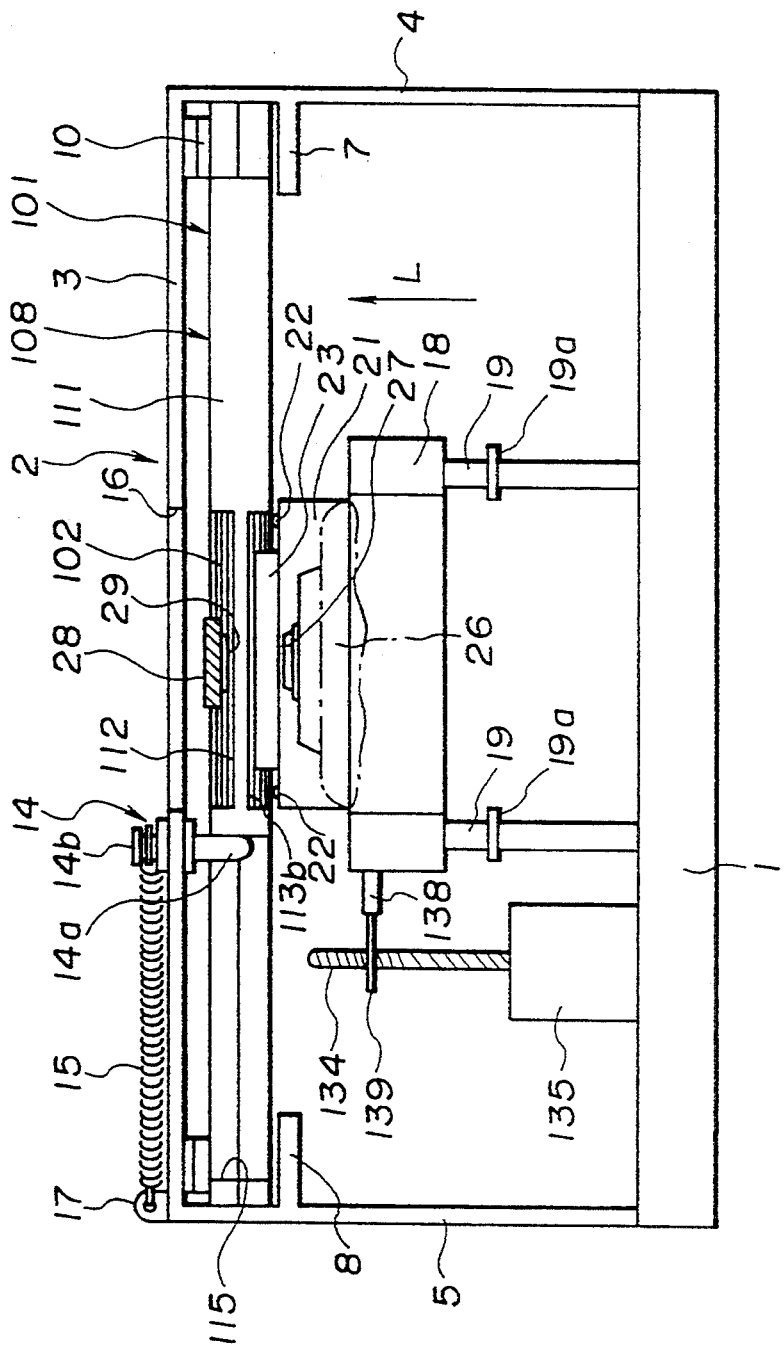
FIG. 16 is an enlarged back side view showing the state in which the holding operation of the disc cartridge introduced into the disc recording/reproducing apparatus of FIG. 13 is just completed.

As the disc cartridge 101 is introduced as far as a predetermined end position of insertion, the disc table 23 and the disc hub 105 face each other at a substantially coaxially aligned position. A detection device, such as a detection switch, senses that the disc cartridge 101 is inserted as far as the insertion end position, and transmits a corresponding detection signal to the controller of the recording and/or reproducing apparatus. The controller then actuates the lifting motor 135 so that the lead screw shaft 34 is rotated to shift the vertically movable block 18 upward away from the chassis 1 as indicated by arrow L in FIG. 16. When the vertically movable block 18 reaches the predetermined upper loading position, the disc hub 105 of the disc 103 is set on the disc table 23, as shown in FIG. 16, while the cartridge main body 103 is set on the cartridge positioning member 21. At this time, the distal end of the spindle shaft 24 is introduced into the centering hole 106, while the positioning protuberances 22 of the cartridge positioning member 21 are abutted against the positioning recess 107 of the cartridge main body 103.

By being thus set on the cartridge positioning member 21, the cartridge main body 103 is displaced away from the guide lugs 7, 8 against the bias of the cartridge body thrusting spring sections 9 to 12. On the other hand, with the disc hub 105 thus set on the disc table 23, the disc 102 is displaced away from the inner wall of the cartridge main body 103. Since the distance between the upper surface of the disc table 23 and the upper ends of the protuberances 22 of the cartridge body positioning member 21 is always constant, the disc 102 is maintained at a predetermined position with respect to the cartridge main body 103. The disc hub 105 is maintained stationarily relative to the disc table 23 under the force of attraction exerted by the permanent magnet 25.

When the spindle motor 20 is actuated in this state, the magneto-optical disc 102 is rotated simultaneously with the disc table 23.

Figure 17:
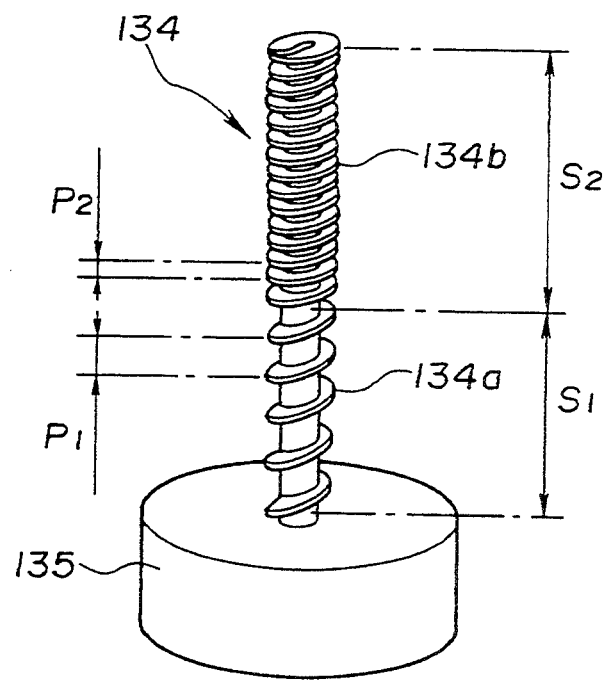
FIG. 17 is an enlarged perspective view showing a construction of a driving device employed in the disc recording/reproducing apparatus shown in FIG. 13.
Figure 18:
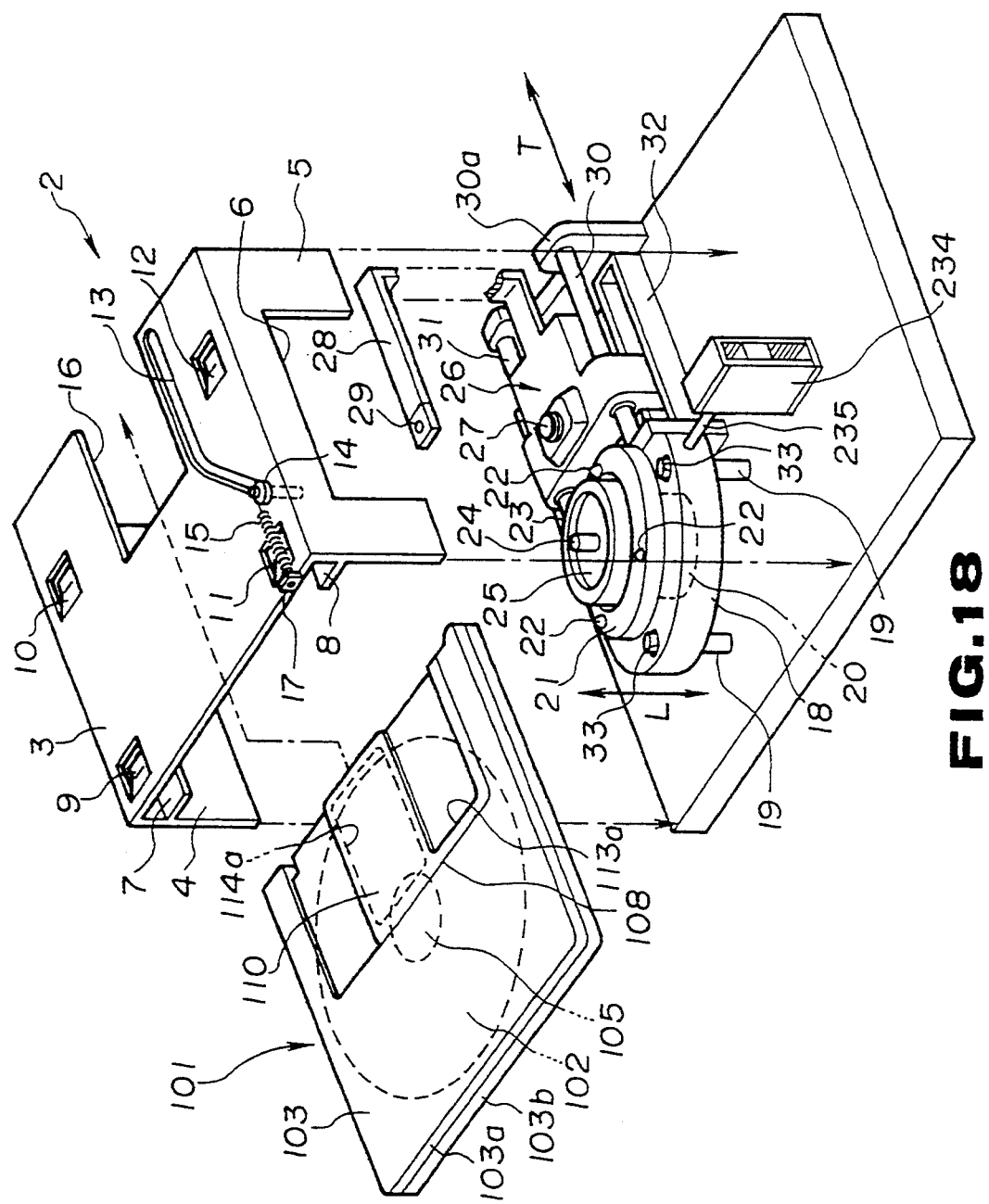
FIG. 18 is a partially exploded perspective view showing a construction of a disc cartridge loaded in a disc recording/reproducing apparatus according to a third embodiment of the present invention.

Referring to FIG. 17, the screw part of the lead screw 134 is made up of two contiguous screw sections, namely a first screw section 134a, shown by an arrow $S_1$ in FIG. 18, for holding the disc 102, by way of the loading operation, and a second screw section 134b, shown by arrow $S_2$ in FIG. 17, for adjusting the height of the disc cartridge 101 after the end of the loading operation. The first screw section 134a has a first screw pitch shown by an arrow $P_1$ in FIG. 17, while the second screw section 134b has a second screw pitch $P_2$ smaller than the first screw pitch, as shown by arrow $P_2$ in FIG. 17.

With the engaging section 139 of the arm 138 engaged with the second screw section 134b, an accurate lifting movement of the vertically movable block 18 may be realized by the lifting motor 135 with a fine step of e.g. 1 μm because of the fine screw pitch and moderate gradient of the second screw section 134b. Thus, with the present second embodiment of the recording and/or reproducing apparatus, the vertically movable block 18 may be moved vertically by small steps by the lifting motor 135 after the end of the loading operation, thereby adjusting the magneto-optical disc 102 so that the disc 102 is perpetually at a predetermined position relative to the object lens 27.

That is, with the present second embodiment of the recording and/or reproducing apparatus, the driving of the lifting motor 135 may be controlled on the basis of the focusing error signals derived from the optical pickup device 26 for effecting a focusing servo operation of bringing the signal recording surface of the magneto-optical disc 102 into coincidence with a plane including the focal point of the light flux produced by the object lens 27. Thus, with the optical pickup device 26 of the present recording/reproducing apparatus, there is no necessity of providing an object lens driving unit (actuator) for shifting the object lens 27 along the optical axis.

Referring to FIG. 18 et seq., a disc recording and/or reproducing apparatus according to a third embodiment of the present embodiment is explained. In these figures, parts or components which are the same as those of the preceding first embodiment are depicted by the same reference numerals and the corresponding description is omitted for simplicity.

A linear pulse motor 234 for lifting or lowering the vertically movable block 18 simultaneously with the disc table 23, that is for moving these components in a direction towards and away from the chassis 1, is provided laterally of the spindle motor 20 on the chassis 1. This linear pulse motor 234 is provided on the chassis 1 so that the direction of movement of the movable parts is substantially normal to the chassis 1. A driven part of the linear pulse motor 234 is engaged with an arm 235 mounted on the vertically movable block 18 which is moved via the arm 235 on actuation of the linear pulse motor 234.

Figure 22:
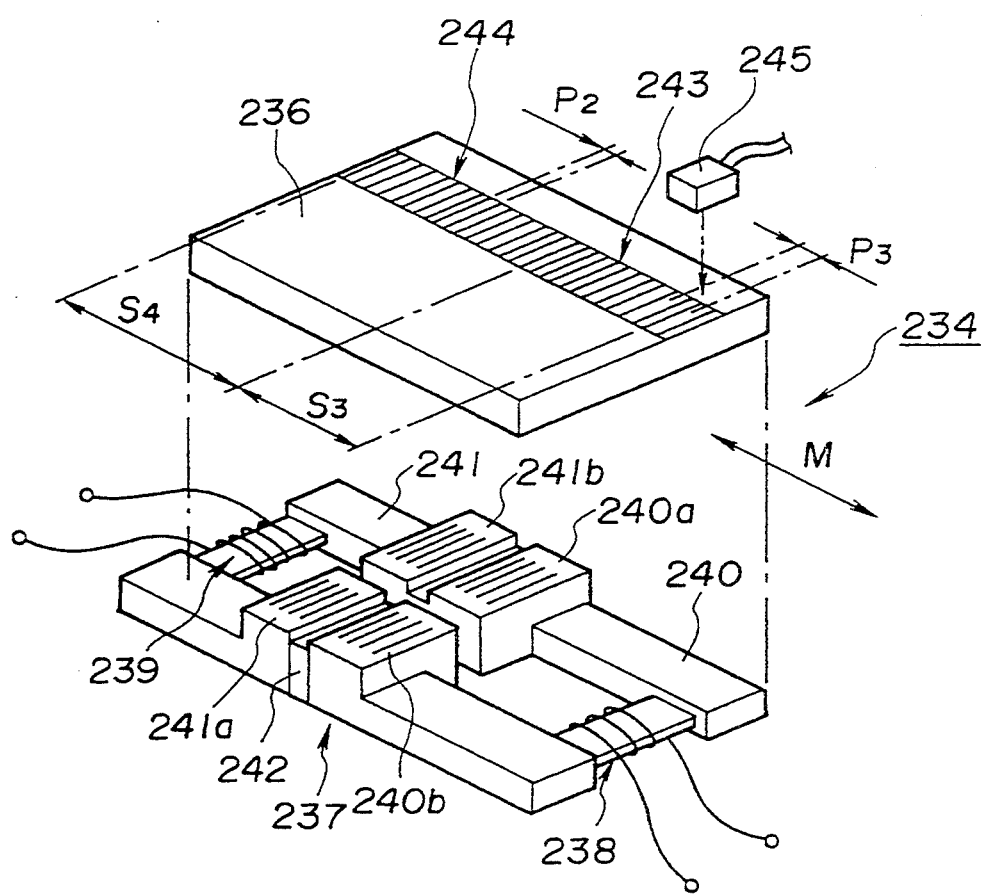
FIG. 22 is an enlarged exploded perspective view showing a construction of a driving device according to the present invention.

Referring to FIG. 22, the linear pulse motor 234 is provided with a fixed part 237 made up of a permanent magnet 242 and a pair of magnetic yokes 240, 241 having their magnetic poles directed to each other with the permanent magnet 242 in-between. The linear pulse motor 234 is also provided with a movable part 236 formed of a magnetic material and spaced a minor distance from the fixed part 237. The magnetic yokes 240, 241 are wound by coils 238, 239. When a predetermined pulse current is supplied to these coils 238, 239, stray magnetic flux is produced via magnetic poles 240a, 240b, 241a and 241b of the magnetic poles 240, 241 towards the movable part 236. The sides of the magnetic poles 240a, 240b, 241a, 241b facing the movable part 236 are formed with magnetic pole teeth of small pitches, while the sides of the movable part facing the magnetic poles are formed with magnetic pole teeth of equally small pitches which are different from those of the magnetic pole teeth of the magnetic poles. By the phase difference between the magnetic pole teeth of the movable part 236 and those of the magnetic poles 240a, 240b, 241a and 241b, the movable part 236 is moved in a direction normal to the direction of these magnetic pole teeth, as indicated by arrow M in FIG. 22.

When loading the disc cartridge 101 in the above-described disc recording/reproducing apparatus of the preset invention, the disc cartridge 101 is introduced from the forward side into a space between the upper plate section 3 and the cartridge body guide lugs 7, 8. At this time, the disc cartridge 101 is introduced with the lateral side thereof fitted with the shutter member 108 directed forwards as shown in FIG. 18.

Figure 19:
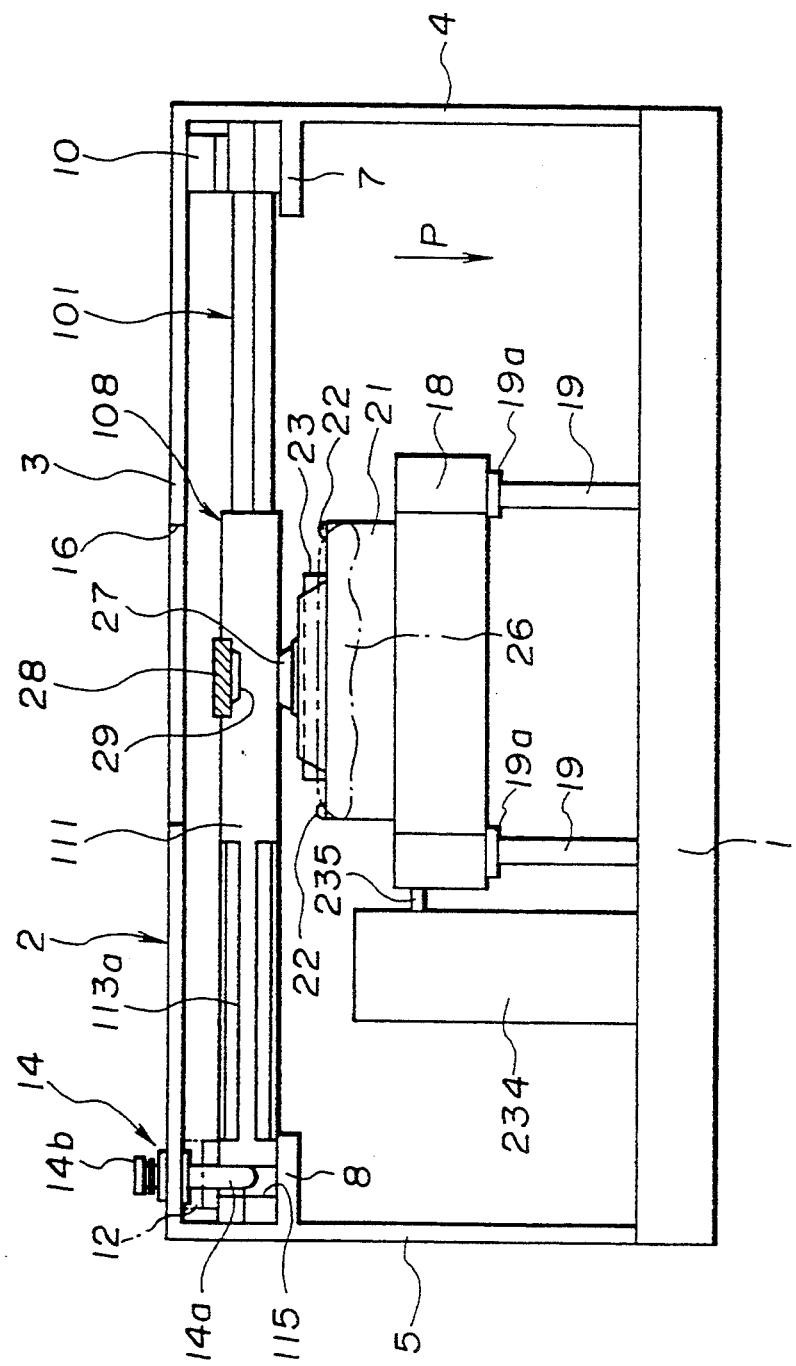
FIG. 19 is an enlarged back side view showing the state in which the operation of introducing the disc cartridge into the disc recording/reproducing apparatus shown in FIG. 18 is just started.

Then, as shown in FIG. 19, the lower end section 14a of the shutter opening pin 14 is abutted against an end of the connecting web section 111 of the shutter member 108 on a lateral side of the cartridge main body 103. It is noted that a recess 115 adapted to be engaged by the lower end section 14a of the shutter opening pin 14 is formed in the vicinity of the above-mentioned end of the connecting web section 111 engaged with the lower end section 14a of the shutter opening pin 14.

Figure 20:
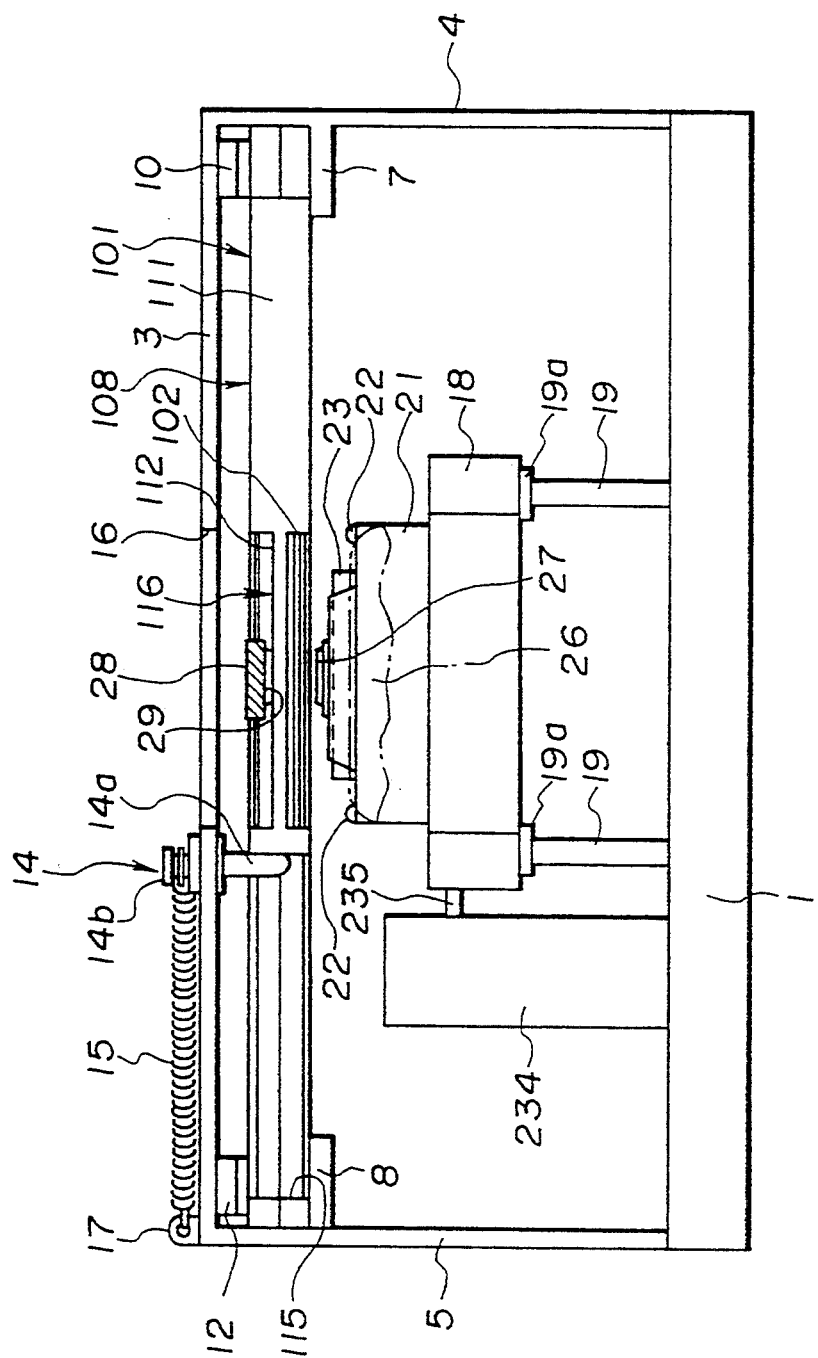
FIG. 20 is an enlarged back side view showing the state in which the operation of introducing the disc cartridge into the disc recording/reproducing apparatus shown in FIG. 18 is just completed.

When the disc cartridge 101 is introduced further into the space between the upper plate section 3 and the guide lugs 7, 8, the shutter opening pin 14 is thrust by the cartridge main body 103 and thereby moved rearwards, as shown in FIG. 20. At this time, the shutter opening pin 14 thrusts the connecting web 111 of the shutter member 108, while being moved along the guide slit 13, for moving the shutter member 108 for opening the recording/reproducing apertures 114a, 114b. When the shutter member 108 opens the recording/reproducing apertures 114a, 114b, the foremost parts of the apertures 112, 113a are positioned substantially at a mid part of the lateral side of the cartridge main body 103. The forward side 116 of the cartridge main body 103 is then laid to outside via these apertures 112, 113a.

When the disc cartridge 101 is introduced further into a space between the upper plate section 3 and the guide lugs 7, 8, the disc cartridge 101 is moved towards the rear as viewed in the inserting direction thereof, while being thrust towards the guide lugs 7 and 8 within the cartridge holder 2 by the thrusting spring sections 9 to 12, as indicated by arrow P in FIG. 19. At this time, the disc cartridge 101 is moved in such a manner that the narrow width part of the connecting web section 111, the forward lateral side 116 of the cartridge main body 3 and the disc 102 pass through the spacing between the object lens 27 and the magnetic head device 29 in this sequence. Inasmuch as the distance between the object lens 27 and the magnetic head device 29 is wider than the thickness of the disc 102, the disc 102 may be passed through the spacing between the object lens 27 and the magnetic head device 29 without being abutted against the object lens 27 or the magnetic head device 29. Meanwhile, the vertically movable block 18 is positioned in its initial position with the lower surface thereof abutted against positioning pins 19a, 19b provided on the motor guide shafts 19, 19.

Figure 21:
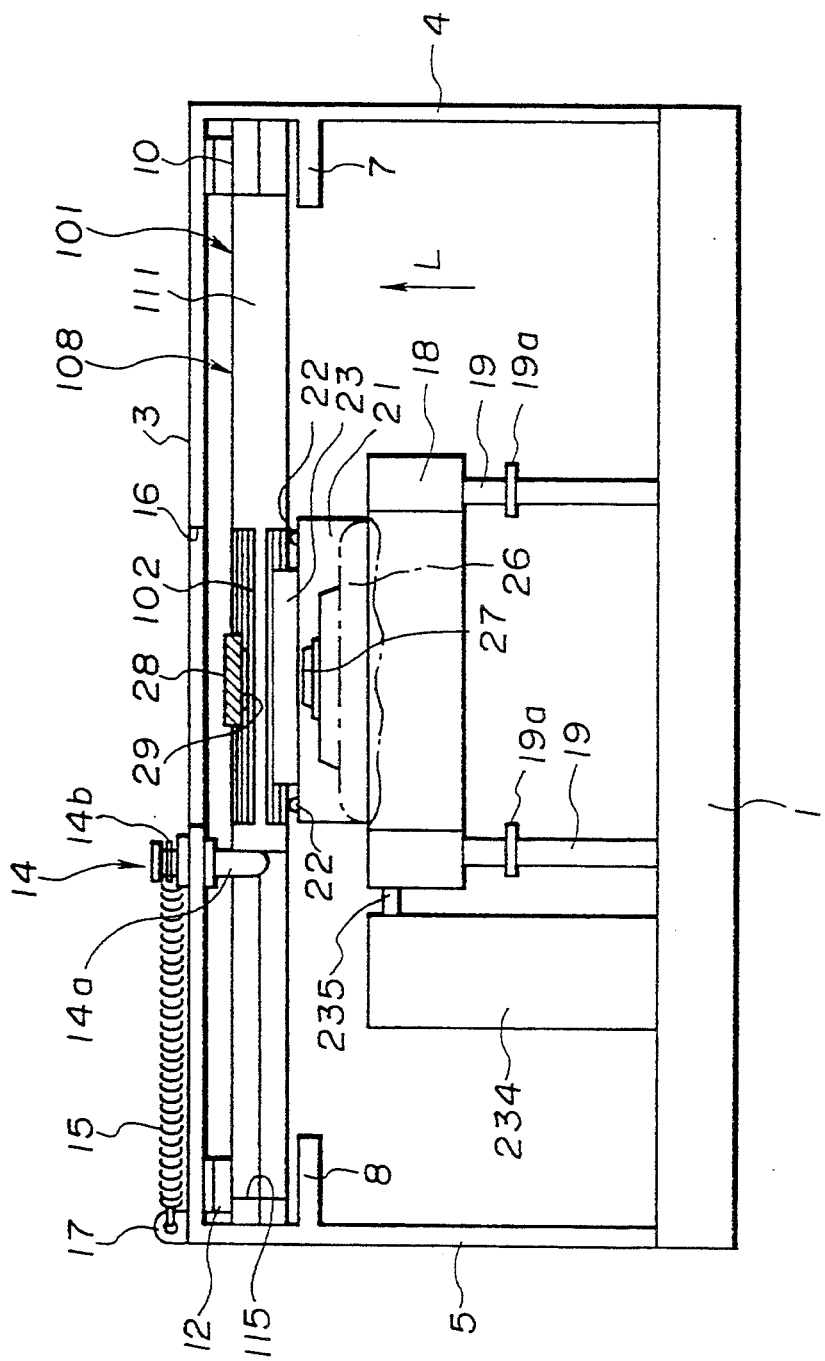
FIG. 21 is an enlarged back side view showing the state in which the holding operation of the disc cartridge introduced into the disc recording/reproducing apparatus of FIG. 18 is just completed.

When the disc cartridge 101 is inserted to a predetermined end of insertion position, the disc table 23 faces the disc hub 105 substantially coaxially therewith. At this time, a detection device, such as a detection switch, senses that the disc cartridge 101 is loaded to the end position, and a corresponding detection signal indicating the end of insertion is transmitted to a controller of the recording/reproducing apparatus. The controller then actuates the linear pulse motor 234. The arm 235 is moved by the actuation of the linear pulse motor 234 so that the vertically movable block 18 is moved upward away from the chassis 1, as indicated by arrow L in FIG. 21. When the block 18 is raised to a predetermined loading position, the disc hub 105 is set on the disc table 23 as shown in FIG. 21, while the cartridge main body 103 is set on the cartridge body positioning member 21. The distal end of the spindle shaft 24 is engaged at this time in the centering hole 106, while the positioning recess 107 of the cartridge main body 103 is engaged by the protuberances 22 of the cartridge body positioning member 21.

The cartridge main body 103, thus set on the cartridge body positioning member 21, is moved away from the cartridge guide lugs 7, 8 against the bias of the cartridge body thrusting spring sections 9 to 12. With the disc hub 105 thus set on the disc table 23, the magneto-optical disc 102 is moved away from the inner wall sections of the cartridge main body 103. Since the distance between the upper surface of the disc table 23 and the end parts of the protuberances 22 of the cartridge body positioning member 21 is constant at all times, the magneto-optical disc 102 is maintained at a constant position with respect to the cartridge main body 103. The disc hub 105 is maintained relative to the disc table 23 under the magnetic attraction exerted by the permanent magnet 25.

When the spindle motor 20 is actuated in this state, the disc 102 is rotationally driven along with the disc table 23.

The movable part 236 of the linear pulse motor 234 is provided with an encoder for detecting the movement positions of the movable part 236. This encoder is made up of a first group of encoder slits 243, formed in the movable part 236, as indicated by arrow $S_3$ in FIG. 22, a second group of encoder slits 244, similarly formed in the movable part 236, as indicated by arrow $S_4$ in FIG. 22, and a detector 245 mounted facing these encoder slits 243, 244. The first and second group encoder slits 243, 244 are each constituted by plural slits extending parallel to one another and normal to the movement direction of the movable part 236. The detector 240 radiates a light flux from a detection light source to the encoder slits 243, 244 of the movable part 236 and detects the light flux transmitted through these slits or reflected back from the solid area between these slits for generating detection signals for calculating the movement velocity as well as position of the movable part 236.

The first group encoder slits 243 are of a first pitch $P_3$ shown in FIG. 22. The second group encoder slits 244 are of a second pitch $P_4$ which is much smaller than the first pitch, as indicated by arrow $P_4$ in FIG. 22.

Because of the small pitch of the second group encoder slits 244, the vertically movable block 18 may be accurately lifted or lowered relative to the block 18 by minute movement steps of e.g. 1 μm. Thus it is possible with the present third embodiment of the recording and/or reproducing apparatus to lift or lower the block 18 by minute steps by the linear motor 234 after the end of loading for making adjustments so that the disc 102 is always at a predetermined position with respect to the object lens 27.

That is, it is possible with the present embodiment of the present invention to control the driving of the linear pulse motor 234 based on focusing error signals derived from the optical pickup device 26 for setting the focal point of the light flux via object lens 27 so as to be within the signal recording surface of the disc 102 by way of a focusing servo operation. Thus it is unnecessary in the optical pickup device 26 of the disc recording and/or reproducing apparatus to provide an object lens driving device (actuator) for driving the object lens 27 along the optical axis.

In the above-described disc recording and/or reproducing apparatus of the present invention, the positioning device for setting the height of the cartridge main body housing the recording disc is provided in the fixed part of the rotational driving device adapted for rotationally driving the recording disc. That is, in the present disc recording and/or reproducing apparatus, the positioning device for positioning the cartridge main body and the positioning device for positioning the recording disc are mounted close to each other, so that it is possible to maintain an accurate relative position between the cartridge main body and the recording disc.

There is no necessity of separately providing the positioning devices for the cartridge main body and the recording disc, while there is no necessity of providing a positioning member, such as a positioning pin, on the chassis, so that the number of component parts may be diminished.

In this manner, the recording disc may be maintained accurately with respect to the recording disc in the cartridge main body, while the manufacture may be facilitated as a result of reduction of the number of the component parts.

Besides, in the disc recording and/or reproducing apparatus of the present invention, since a vibration absorber is provided between the driving part rotationally driving the disc table carrying the recording disc and the fixed part holding the driving part, it is possible to prevent vibrations from being transmitted between the driving and fixed parts and hence to prevent a resonant loop from being formed between the driving and the fixed parts.

On the other hand, in the disc recording and/or reproducing apparatus of the present invention, since the portion of the disc table carrying the recording disc and rotationally driven by driving means which is abutted by the recording disc is formed of a vibration absorber, the vibrations transmitted from the chassis are not transmitted to the recording disc, Thus it is possible with the present disc recording and/or reproducing apparatus to prevent a resonant loop form being formed inclusive of the recording disc.

With the above described disc recording and/or reproducing apparatus of the present invention, the disc rotating and driving device is lifted and lowered relative to the chassis by a cam mechanism for holding he disc, so that a resonant loop is not formed between it and the chassis. With the present disc recording and/or reproducing apparatus, the recording disc may be held by the disc rotating and driving device without providing a so-called disc loading mechanism.

Also, with the disc recording and/or reproducing apparatus, by providing detection means for detecting the rotation of the final stage gear of the cam mechanism, the height position of the rotating and driving means may be controlled on the basis of the rotation of the final stage gear.

Thus, according to the present invention, the disc recording and/or reproducing apparatus is provided in which not only the construction is simplified and the manufacture is facilitated, but also resonant vibrations may be prevented easily from being produced on the chassis.

What is claimed is:

1. A disc recording and/or reproducing apparatus for reproducing a disc housed in a cartridge, comprising:
    head means for reproducing the disc contained within the cartridge;
    rotating and driving means for rotationally driving the disc housed within the cartridge, the rotating and driving means including a spindle motor, a disc table driven by the spindle motor for engaging a hub on the disc, a positioning member for engaging and supporting the cartridge, the positioning member and the disc table having a predetermined distance between them in a direction parallel to an axis of rotation of the disc table such that when the positioning member is engaged with and supporting the cartridge and the disc table is engaged with the disc hub, the disc is supported within the cartridge free from contact with any interior surface of the cartridge., and vibration damping means interposed between the spindle motor and the disc table;

holding means for holding the cartridge while the rotating and driving means rotationally drives the disc housed in the cartridge, the holding means having a resilient biasing means for applying a resilient biasing force against the cartridge toward the rotating and driving means to force the cartridge against the positioning member; and lifting means for lifting the rotating and driving means relative to the holding means so as to bring the disc table into engagement with the disc hub and the positioning member into engagement with the cartridge for a disc reproducing operation and after the disc reproducing operation lowering the rotating and driving means away from the holding means;

wherein the lifting means includes a cam member engaged with the rotating and driving means, the cam member including a first cam surface and a second cam surface continuous with the first cam surface, wherein the first cam surface is steep relative to the second cam surface and is for lifting and lowering the rotating and driving means, and the second cam surface is for effecting fine adjustment of the rotating and driving means at a lifted position thereof, cam driving means for rotationally driving the cam member, and angular positioning means for detecting the angular position of the cam member and controlling the cam driving means as a function of the detected angular position.

2. A disc recording and/or reproducing apparatus according to claim 1, wherein the cam member is provided with encoder slits of a first pitch corresponding to the first cam surface and encoder slits of a second pitch corresponding to the second cam surface, and the angular positioning means includes photodetection means for sensing the angular position of the encoder slits and generating a control signal to the cam driving means.

3. A disc recording and/or reproducing apparatus according to claim 1, wherein the cam member is a screw and the first cam surface is a portion of the screw having a first pitch and the second cam surface is a portion of the screw having a second pitch which is finer than the first pitch.

4. A disc recording and/or reproducing apparatus according to claim 1, further comprising:
means for controlling the cam driving motor based on focusing error signals received from the head means during a time when the second cam surface is engaged with the rotating and driving means.

5. A disc recording and/or reproducing apparatus according to claim 1, further comprising:
means for controlling the lifting means based on focusing error signals received from the head means.

6. A disc recording and/or reproducing apparatus according to claim 1 wherein the lifting means is a linear pulse motor.

7. A disc recording and/or reproducing apparatus according to claim 1 wherein the positioning member engages and supports a bottom of the cartridge.

* * * * *

UNITED STATES PATENT AND TRADEMARK OFFICE
CERTIFICATE OF CORRECTION

PATENT NO. : 5,416,762

DATED : May 16, 1995

INVENTOR(S): Kiyoshi Ohmori and Katsuhiro Seo

It is certified that error appears in the above - identified patent and that said Letters Patent is hereby corrected as shown below:

Column 19, line 2, change "cartridge.," to --cartridge,--.

Signed and Sealed this

Twenty-ninth Day of August, 1995

Attest:

BRUCE LEHMAN

*Attesting Officer*        *Commissioner of Patents and Trademarks*